US012451852B2

(12) United States Patent
Naaman

(10) Patent No.: US 12,451,852 B2
(45) Date of Patent: Oct. 21, 2025

(54) JOSEPHSON PARAMETRIC COUPLER

(71) Applicant: Google LLC, Mountain View, CA (US)

(72) Inventor: Ofer Naaman, Santa Barbara, CA (US)

(73) Assignee: Google LLC, Mountain View, CA (US)

(*) Notice: Subject to any disclaimer, the term of this patent is extended or adjusted under 35 U.S.C. 154(b) by 702 days.

(21) Appl. No.: 17/780,464

(22) PCT Filed: Nov. 25, 2020

(86) PCT No.: PCT/US2020/062146
§ 371 (c)(1),
(2) Date: May 26, 2022

(87) PCT Pub. No.: WO2021/108487
PCT Pub. Date: Jun. 3, 2021

(65) Prior Publication Data
US 2023/0006626 A1    Jan. 5, 2023

Related U.S. Application Data

(60) Provisional application No. 62/941,323, filed on Nov. 27, 2019.

(51) Int. Cl.
H03F 19/00    (2006.01)
G06N 10/40    (2022.01)
(52) U.S. Cl.
CPC ............. H03F 19/00 (2013.01); G06N 10/40 (2022.01)
(58) Field of Classification Search
CPC ........... H03F 19/00; H03F 1/42; G06N 10/40; H03K 17/92
(Continued)

(56) References Cited

U.S. PATENT DOCUMENTS 9,928,948 B2 *  3/2018  Naaman ................... H01F 6/06
2003/0052750 A1  3/2003  Shamsaifar et al.
(Continued)

FOREIGN PATENT DOCUMENTS

JP    H08-293708    11/1996
JP    2018-538681   12/2018
(Continued)

OTHER PUBLICATIONS

Office Action in Australian Appln. No. 2023254951, mailed on Jun. 14, 2024, 4 pages.
(Continued)

Primary Examiner — Hieu P Nguyen
(74) Attorney, Agent, or Firm — Fish & Richardson P.C.

(57) ABSTRACT

A Josephson parametric device is presented, which includes an input port, an output port, and a signal path between the input port and the output port. The signal path includes a first section coupled to the input port and having a first passband, a second section coupled to the output port and having a second passband and a Josephson junction coupling element for parametric coupling between the first and second section. The Josephson junction coupling element is coupled to and interposed between the first section and the second section. The Josephson junction coupling element is configured such that, in response to the input port receiving a first signal at a first frequency lying within the first passband and the Josephson junction coupling element receiving a pump tone, the Josephson junction coupling element converts the first signal into a second signal with a second frequency lying within the second passband.

19 Claims, 10 Drawing Sheets

(58) Field of Classification Search
USPC .................................................. 330/4.5–4.6
See application file for complete search history.

(56) References Cited

U.S. PATENT DOCUMENTS

2017/0085231 A1  3/2017  Abdo et al.
2019/0131944 A1  5/2019  Naaman et al.

FOREIGN PATENT DOCUMENTS

JP        2019-530336       10/2019
WO     WO 2019038518       2/2019

OTHER PUBLICATIONS

Office Action in Canada Appln. No. 3,162,625, mailed on May 8, 2024, 4 pages.
Office Action in Japanese Appln. No. 2022-531558, mailed on Mar. 11, 2024, 13 pages (with English translation).
Notice of Allowance in Japanese Appln. No. 2022-531558, mailed on Nov. 5, 2024, 5 pages (with English translation).
Notice of Allowance in Australian Appln. No. 2020391183, mailed on Jul. 17, 2023, 3 pages.
Office Action in Japanese Appln. No. 2022-531558, mailed on Sep. 11, 2023, 15 pages.
Abdo et al., "Nondegenerate three-wave mixing with the Josephson ring modulator", Physical Review B, Jan. 16, 2013, 18 pages.
Chen et al., "Qubit architecture with high coherence and fast tunable coupling," arXiv, Feb. 28, 2014, 10 pages.
Flurin, "The Josephson mixer : a swiss army knife for microwave quantum optics," Quantum Physics, Dec. 10, 2014, 251 pages.
International Preliminary Report on Patentability in International Appln. No. PCT/US2020/062146, mailed on Jun. 9, 2022, 13 pages.
International Search Report and Written Opinion in International Appln. No. PCT/US2020/062146, mailed on May 3, 2021, 21 pages.
Invitation to Pay Additional Fees in International Appln. No. PCT/US2020/062146, mailed on Mar. 11, 2021, 13 pages.
Lecocq et al., "Nonreciprocal Microwave Signal Processing with a Field-Programmable Josephson Amplifier," Phys. Rev. Applied, Feb. 27, 2017, 7(2):1-17.
Matthaei, "A study of the optimum design of wide-band parametric amplifiers and up-converters," IRE Transactions on Microwave Theory and Techniques, Jan. 1961, pp. 23-38.
Naaman et al., "Broadband design of parametric non-reciprocal devices," Presented at 2019 APS March Meeting, Boston, Massachussets, Mar. 4, 2019, 19 pages.
Naaman et al., "On-Chip Josephson Junction Microwave Switch," arXiv, Dec. 4, 2015, 10 pages.
Office Action in Australian Appln. No. 2020391183, dated Dec. 20, 2022, 4 pages.
Notice of Allowance in Australian Appln. No. 2023254951, mailed on Feb. 17, 2025, 3 pages.

* cited by examiner

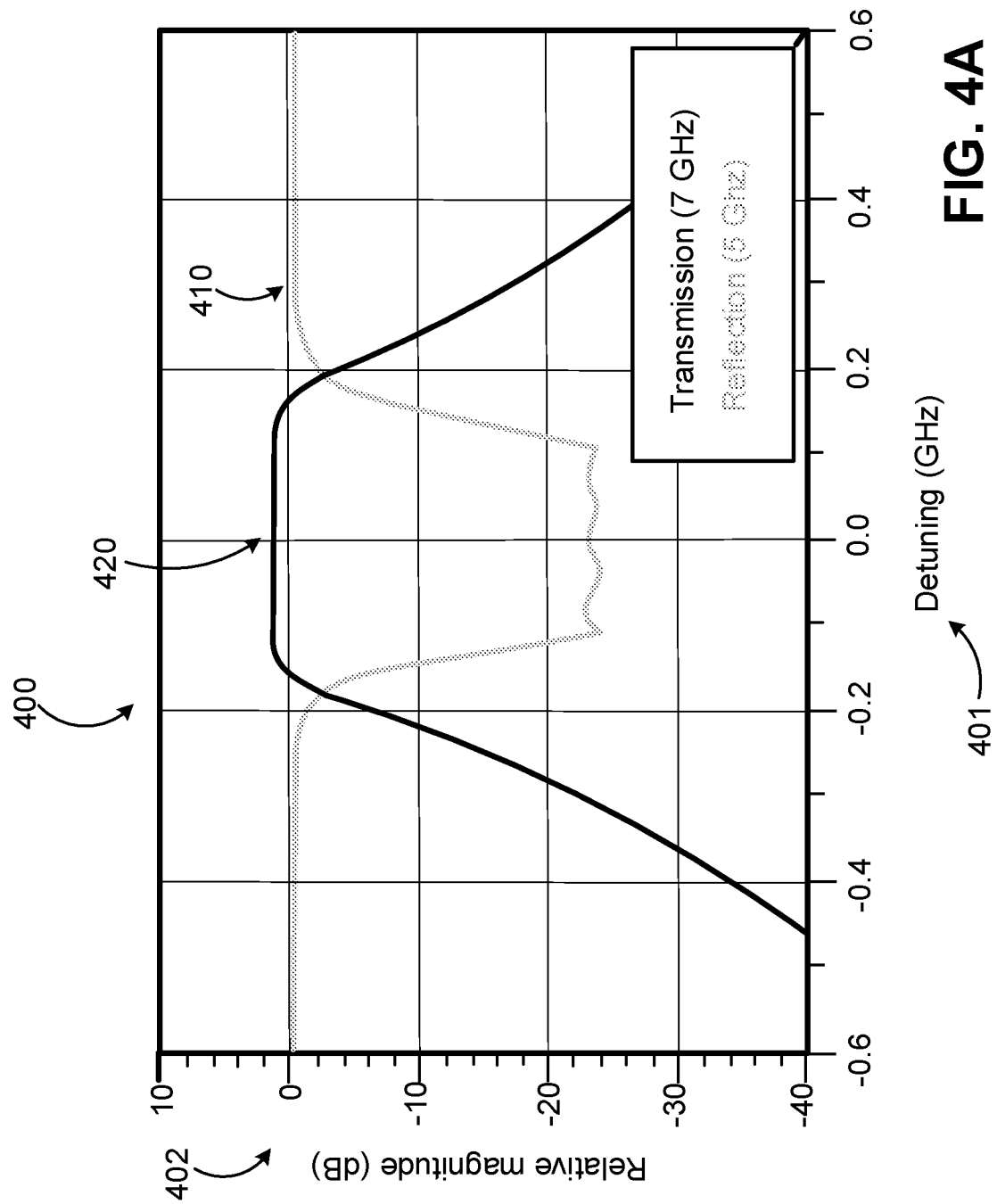

JOSEPHSON PARAMETRIC COUPLER

CROSS-REFERENCE TO RELATED APPLICATION

This application is a National Stage Application under 35 U.S.C. § 371 of International Application No. PCT/US2020/062146, filed on Nov. 25, 2020, which claims priority to U.S. Provisional Application Ser. No. 62/941,323, filed on Nov. 27, 2019. The disclosure of the prior applications are considered part of and are incorporated by reference in the disclosure of this application.

TECHNICAL FIELD

This present subject matter relates to Josephson parametric couplers.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure relates to Josephson parametric couplers including, among other things, technologies for implementing amplification devices for state measurements of qubits.

In general, an innovative aspect of the subject matter of the present disclosure may be embodied in a Josephson parametric device, which includes an input port, an output port, and a signal path between the input port and the output port. The signal path includes a first section coupled to the input port and having a first passband, a second section coupled to the output port and having a second passband and a Josephson junction coupling element for parametric coupling between the first section and the second section. The Josephson junction coupling element is coupled to and interposed between the first section and the second section. The Josephson junction coupling element is configured such that, in response to the input port receiving a first signal at a first frequency lying within the first passband and the Josephson junction coupling element receiving a pump tone, the Josephson junction coupling element converts the first signal into a second signal with a second frequency lying within the second passband.

The foregoing and other implementations can each optionally include one or more of the following features, alone or in combination.

In some implementations, the second frequency is a sum of the first frequency and a frequency of the pump tone.

In some implementations, a frequency of the pump tone is a sum of the first frequency and the second frequency.

In some implementations, the Josephson coupling element includes a Josephson junction, a first resonator having the first passband and a second resonator having the second passband. The Josephson junction is interposed between and connected to the first resonator and the second resonator.

In some implementations, the first resonator comprises a first series inductor and a first shunt capacitor. The second resonator comprises a second series inductor and a second shunt capacitor. The first series inductor and the Josephson junction are electrically connected to each other in series, and the second series inductor and the Josephson junction are electrically connected to each other in series.

In some implementations, the first resonator and the second resonator comprise a resonator transmission line stub.

In some implementations, the first resonator and the second resonator comprise a transmission line-based resonator.

In some implementations, the first section comprises at least one shunt resonator having the first passband disposed between the input port and the first resonator in the signal path, and the second section comprises at least one shunt resonator having the second passband disposed between and the second resonator and the output port in the signal path.

In some implementations, each of the at least one resonator comprises a shunt capacitor and a shunt inductor.

In some implementations, each of the at least one resonator comprises a resonator stub.

In some implementations, each of the at least one resonator comprises a transmission line-based resonator.

In some implementations, the Josephson junction coupling element is a RF SQUID.

In some implementations, the RF SQUID is arranged such that, in response to a first external flux bias applied to the RF SQUID, a Josephson inductance value of the RF SQUID diverges such that passive inductive coupling between the first resonator and the second resonator is reduced.

In general, another innovative aspect of the subject matter of the present disclosure may be embodied in a method of designing a Josephson parametric device including an input port, an output port and a signal path between the input port and the output port wherein the signal path includes a first section coupled to the input port and having a first passband, a second section filter coupled to the output port and having a second passband and a Josephson junction coupling element interposed between the first section and the second section. The method includes: providing a first number of resonators j in the first section and a second number of resonators N-j in the second section; providing a first resonance frequency $\omega_A$ to the resonators in the first section and a second resonance frequency $\omega_B$ to the resonators in the second section and a decay rate $\gamma$ between the input port and the first section and between the second section and the output port; providing a bandwidth, $\delta\omega$, of the first section and the second section; providing an impedance $Z_1$ to $Z_N$ for each of the resonators; providing normalized element values $g_0$ to $g_{N+1}$. $g_0$ represents a normalized impedance at the input port, $g_{N+1}$ represents a normalized impedance at the output port, and $g_1$ to $g_N$ represent normalized impedances of the N resonators. The normalized element values $g_0$ to $g_{N+1}$ are determined according to tabulated values of a response function of the first section and the second section. The method further includes: calculating admittance values, $J_{01}$ to $J_{N,N+1}$, wherein a first admittance value, $J_{01}$, represents admittance of a first circuit element to be disposed between the input port and the resonator of the first section adjacent to and coupled to the input port, a N+1-th admittance value, $J_{N,N+1}$, represents admittance of N+1th circuit element to be disposed between the output port and the N-th resonator of the second section adjacent to and connected to the output port, and a i-th admittance value, $J_{i-1,i}$, represents admittance of (i)-th circuit element to be disposed between the (i−1)-th resonator and the i-th resonator. The first admittance value, $J_{01}$, is given by $$J_{01} = \sqrt{\frac{\delta\omega/\omega_1}{Z_1 Z_0 g_1 g_0}}.$$

The i-th admittance value, $J_{i-1,i}$, is given by $$J_{i-1,i} = \sqrt{\frac{\delta\omega^2/\omega_{i-1}\omega_i}{Z_{i-1} Z_i g_{i-1} g_i}},$$

and the N+1-th admittance value, $J_{N,N+1}$, is given by $$J_{N,N+1} = \sqrt{\frac{\delta\omega/\omega_N}{Z_N Z_0 g_N g_{N+1}}},$$

where $Z_0$ is an impedance of the input port, $Z_{N+1}$ is an impedance of the output port, and $Z_i$ is an impedance of i-th resonator. The method further includes: calculating a coupling coefficient, $\beta_{j,j+1}$, representing a degree of coupling between a j-th resonator included in the first section and a j+1-th resonator included in the second section, wherein j is the first number and N-j is the second number, wherein the coupling coefficient, $\beta_{j,j+1}$, is given by $$\beta_{j,j+1} = \frac{\delta\omega}{2\gamma\sqrt{g_j g_{j+1}}}.$$

The method further includes calculating, based on the coupling coefficient, $\beta_{j,j+1}$, an AC flux, $\Phi_{AC}$ for applying to the Josephson junction coupling element.

The foregoing and other implementations can each optionally include one or more of the following features, alone or in combination.

In some implementations, the calculating, based on the coupling coefficient, $\beta_{j,j+1}$, an AC flux, $\Phi_{AC}$ for applying to the Josephson junction coupling element is based on $$\Phi_{AC} = \frac{16\gamma\beta_{j,j+1}}{\frac{dM_{j,j+1}}{d\Phi}} \sqrt{\frac{L_j L_{j+1}}{\omega_A \omega_B}},$$

when a DC flux, $\Phi_{DC}$ applied to the Josephson junction coupling element is given by $$\Phi_{DC} = \frac{1}{4}\Phi_0 + LI_c.$$

L is the linear inductance of the Josephson junction coupling element, $I_C$ is the critical current of the Josephson junction, $\Phi_0$ is the magnetic flux quantum, $$\frac{dM_{j,j+1}}{d\Phi}$$

is the slope of the mutual inductive coupling between j-th resonator and (j+1)-th resonator with respect to flux bias applied to the Josephson coupling element, $L_j$ and $L_{j+1}$ are the inductance values of the j-th resonator and (j+1)-th resonator, respectively.

In some implementations, the Josephson junction coupling element comprises an RF-SQUID.

In some implementations, the first number is equal to the second number such that j=N/2.

In general, another innovative aspect of the subject matter of the present disclosure may be embodied in a method of using a Josephson parametric device, which includes determining the first frequency of the first signal and the second frequency of the second signal, determining a frequency of the pump tone such that when the pump tone is provided to the Josephson coupling element, the first signal is converted into the second signal, providing the pump tone to the Josephson junction coupling element and providing the first signal at the first frequency to the input port.

The details of one or more embodiments are set forth in the accompanying drawings and the description below. Other features and advantages will be apparent from the description and drawings, and from the claims.

BRIEF DESCRIPTION OF THE DRAWINGS

FIGS. 4a and 4b show a simulation result of the Josephson parametric coupler described in FIG. 3.

DETAILED DESCRIPTION

Figure 1:
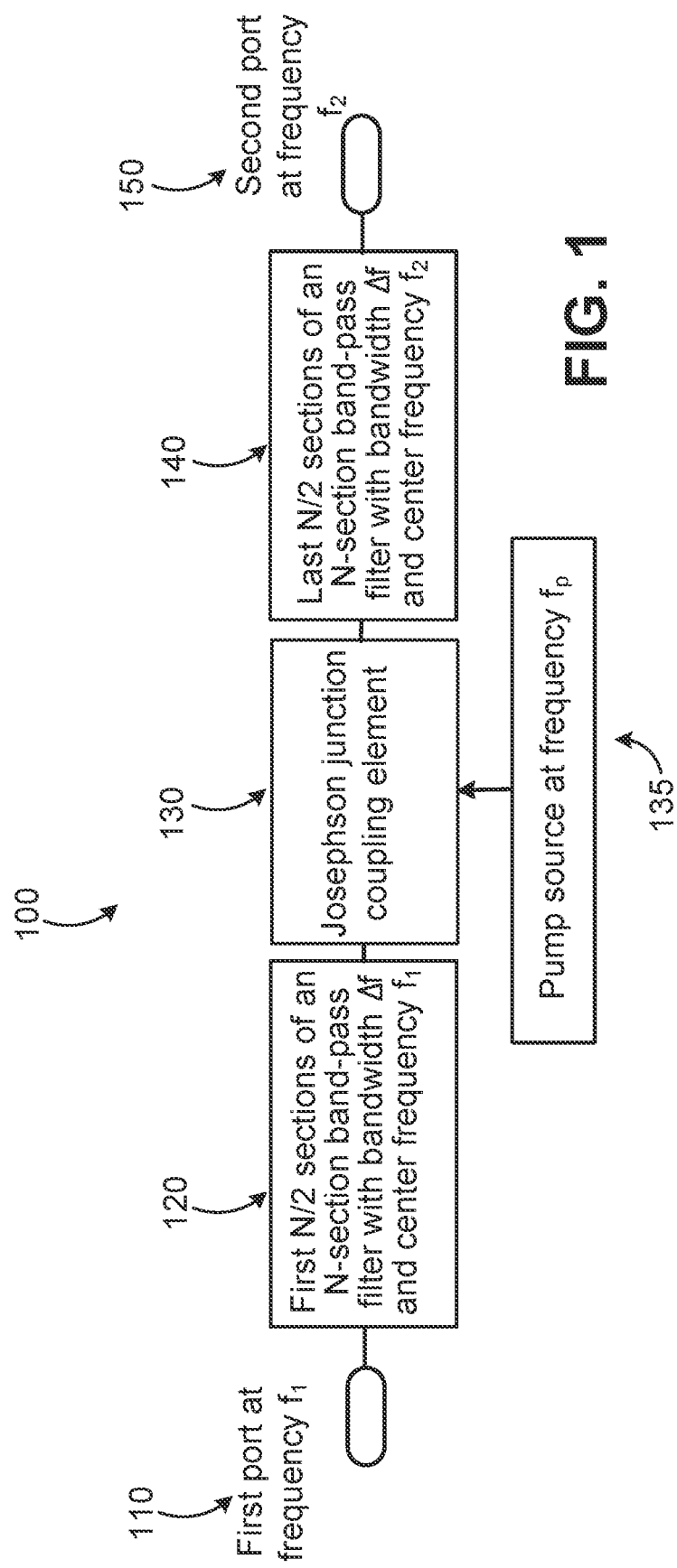
FIG. 1 is a schematic that illustrates an exemplary Josephson parametric coupler.

Quantum computing entails coherently processing quantum information stored in the quantum bits (qubits) of a quantum computer. Superconducting quantum computing is a promising implementation of solid-state quantum computing technology in which quantum information processing systems are formed, in part, from superconducting materials. To operate quantum information processing systems that employ solid-state quantum computing technology, such as superconducting qubits, the systems are maintained at extremely low temperatures, e.g., in the 10 s of mK. The extreme cooling of the systems keeps superconducting materials below their critical temperature and helps avoid unwanted state transitions. To maintain such low temperatures, the quantum information processing systems may be operated within a cryostat, such as a dilution refrigerator.

In some implementations, control signals are generated in higher-temperature environments, and are transmitted to the quantum information processing system using shielded impedance-controlled GHz capable transmission lines, such as coaxial cables. The cryostat may step down from room-temperature (e.g., about 300 K) to the operating temperature of the qubits in one or more intermediate cooling stages. For instance, the cryostat may employ a stage maintained at a temperature range that is colder than room temperature stage by one or two orders of magnitude, e.g., about 30-40 K or about 3-4 K, and warmer than the operating temperature for the qubits (e.g., about 10 mK or less).

In some implementations, the state measurement of superconducting qubits is achieved using a dispersive detection scheme. In order to read out or detect the state of any qubit, a probing signal, e.g., a travelling microwave, may be excited along a readout transmission line coupled to the qubit via a respective readout resonator. The frequency of the probing signal may be in the vicinity of the resonance frequency of the readout resonator. Depending on the internal quantum mechanical state of the qubit, the intensity or phase of the probing signal transmitted along the readout transmission line may be altered because the reflectivity of the readout resonator coupled to the qubit changes depending on the state of the qubit. This allows for the state detection of the qubits.

For high fidelity state measurements of superconducting qubits with near quantum-limited noise performance, a Josephson junction parametric amplifier or a Josephson junction converter may be constructed and used as a pre-amplifier for the probing signal. Within the Josephson junction parametric amplifier or the Josephson junction converter, a Josephson junction acts as a nonlinear inductor where the inductance is dependent on the intensity of a pump tone received at the Josephson junction. Part of the energy of the pump tone is imparted to the probing signal, which leads to the parametric amplification of the probing signal.

In an exemplary readout system, readout resonators for a plurality of sensed qubit signals are coupled to a single readout channel. The probing signals that sense the plurality of readout resonators coupled to the single readout channel are amplified by a pre-amplifier. The pre-amplified signals on the single readout channel are, in turn, amplified by a HEMT (High Electron Mobility Transistor) amplifier. In designing a readout system for a larger number of qubits, one of the conditions to consider includes the saturation intensity of the Josephson junction parametric amplifier or the Josephson junction parametric converter, which limits the number of qubits in each readout channel. The Josephson parametric frequency converters reported to date have been limited to a bandwidth of 10's of MHz, and a low saturation intensity in the pW range.

The present disclosure relates to a circuit design for a parametric coupler including a Josephson junction, which can be used as the preamplifier. In particular, the present disclosure relates to circuit designs that may provide several 100's of MHz bandwidth with prescribed transfer characteristics.

Such designs, which are referred to herein as Josephson parametric couplers, may be constructed as bandpass filters that also function as Josephson parametric amplifiers or Josephson parametric converters. In some implementations, the Josephson parametric coupler may include an RF SQUID. The RF SQUID is embedded between two segments, each of which includes a series of shunt resonators connected by admittance inverters.

The overall design of the Josephson parametric coupler may take the form of coupled resonators, where multiple shunt resonators are connected by admittance inverters, as discussed in detail herein. The parameters of the circuit, for example, the flux bias to be applied to the RF SQUID, can be determined following a RF filter synthesis method with prescribed transfer characteristics.

FIG. 1 is a schematic that illustrates an exemplary Josephson parametric coupler.

The Josephson parametric coupler 100 includes an input port 110, a first section 120, a Josephson junction coupling element 130, a pump source 135, a second section 140, and an output port 150.

An input signal is received at the input port 110. The signal is subsequently transmitted to the first section 120, the Josephson junction coupling element 130, and the second section 140, in this order, and then output at the output port 150.

The first section 120 may include a plurality of resonators such that the overall response of the first section has a first passband with a first center frequency $f_1$ with a first bandwidth $\Delta f_1$.

The second section 140 may include a plurality of resonators such that the overall response of the second section 140 has a second passband with a second center frequency $f_2$ with a second bandwidth $\Delta f_2$. Typically, $\Delta f_1$ may be set to be equal or similar to $\Delta f_2$.

The Josephson coupling element 130 is interposed between and electrically connected to the first section 120 and the second section 140. The first section 120 and the second section 140 are parametrically coupled via the Josephson coupling element 130. The reactance of the Josephson coupling element 130 is modulated by a pump tone provided by the pump source 135. The frequency of the signal input into the Josephson coupling element 130 changes by $f_2-f_1$. For example, if a signal at frequency $f_1+\delta f$ of from the first section 120 enters the Josephson coupling element 130, the frequency of the signal changes to $f_2+\delta f$ when it exits the Josephson coupling element 130 if $\delta f$ is smaller than the bandwidth of the first section 120 and the second section 140.

In some implementations, the Josephson coupling element 130 includes an RF SQUID. At an operating point where the parametric coupling is maximum, the saturation power of the Josephson coupling element 130 can be higher than a circuit including a DC SQUID for a similar level of critical current and biased to a corresponding operating point. This is because for an RF SQUID, the saturation intensity is only limited by the critical current of the Josephson junction. For example, for a critical current of 1 μA, the pump power may be around −90 dBm. Since the probing signal saturation power is typically no more than 1% of the pump power, the saturation power for the probing signal may be around −110 dBm.

In some implementations, the operating point of the Josephson parametric coupler 100 may be determined such that the passive coupling between the first section 120 and the second section 140 is minimized. For the RF SQUID as the Josephson coupling element 130, this operating point corresponds also to the maximum parametric coupling point.

In contrast, if the DC SQUID is used for the Josephson coupling element 130, since it is shunted to a ground, in order to achieve similar suppression of passive coupling between the first section 120 and the second section 140, the inductance of the DC SQUID may have to be set relatively low, which leads to a correspondingly low parametric coupling between the first section 120 and the second section 140. In relation to saturation power, since the point of maximum parametric coupling of the DC SQUID corresponds to an operating point where $I_c \cos(\pi \Phi/\Phi_0)$ is near zero, the power level of the DC SQUID may have to be also relatively low. For the DC SQUID coupling element, the bias point of maximum parametric coupling does not coincide with the bias point of minimum stray passive coupling. The maximum possible bandwidth of the DC SQUID is dependent on the maximum achievable parametric coupling strength as for the case of the RF SQUID.

Therefore, the RF SQUID can be configured to provide purely parametric coupling and little passive coupling because it is not shunted to the ground. This aspect allows a Josephson coupling element 130 design which is described herein.

However, the Josephson parametric coupler 100 described herein is not limited to RF SQUIDs. The design concept relates to modifying the drive-point impedance, as is described herein, and applies to both the RF SQUID and the DC SQUID. In other words, the Josephson parametric coupler 130 may be regarded as functioning as an admittance inverter such that if an admittance Y2 is connected to the output port of the Josephson parametric coupler 130, the impedance presented at the input port of the Josephson parametric coupler 130 is $Y_1=J^2/Y_2$, where J is related to the strength of the parametric coupling and Y1 and Y2 are evaluated at the respective frequencies f1 and f2 of the circuit they are connected to, given that the parametric process is frequency converting. Therefore, the Josephson parametric coupler 130 may be regarded as an impedance or admittance transformer, as will be discussed in more detail later.

In some implementations, the Josephson coupling element 130 may be configured as a Josephson parametric frequency converter. In this case, the frequency of the pump tone is $f_p=f_2-f_1$.

In some implementations, the Josephson coupling element 130 may be configured as a Josephson parametric amplifier. In this case, the frequency of the pump tone is $f_p=f_1+f_2$. Compared to the case where the Josephson coupling element 130 is configured as a Josephson parametric frequency converter, the effective number of poles in the circuit can be lower.

In some implementations, the overall design of the Josephson parametric coupler 100 may take the form of coupled resonators, where multiple shunt resonators are connected by admittance inverters. The parameters of the circuit can therefore be determined following a RF filter synthesis method with prescribed transfer characteristics as is described herein.

In particular, for the purpose of applying the RF filter synthesis method, the Josephson coupling element 130 may be regarded as a 'parametric' admittance inverter, which is analogous to an admittance inverter but acts between two resonators with different resonance frequencies. For example, a desired coupling value of the Josephson coupling element 130 can be determined from a suitable value of the filter coefficient corresponding to the Josephson coupling element's position in the network of shunt resonators included in the Josephson parametric coupler 100. The determined coupling value determines the strength of the parametric coupling at the Josephson coupling element 130, which can be converted into the intensity of the pump tone provided by the pump source 135 and flux biases applied to the Josephson coupling element 130.

In some implementations, the first section 120 may include a plurality of shunt resonators implemented with lumped elements electrically connected to each other by admittance inverters such that the overall response of the first section has a first passband with a first center frequency $f_1$ with a first bandwidth $\Delta f_1$.

In some implementations, the first section 120 may include a plurality of shunt resonators implemented with transmission line-based resonators connected to each other by admittance inverters such that the overall response of the first section has a first passband with a first center frequency $f_1$ with a first bandwidth $\Delta f_1$.

In some implementations, the first section 120 may include a plurality of transmission line stubs such that the overall response of the first section has a first passband with a first center frequency $f_1$ with a first bandwidth $\Delta f_1$.

In some implementations, the second section 140 may include a plurality of shunt resonators implemented with lumped elements electrically connected to each other by admittance inverters such that the overall response of the second section 140 has a second passband with a second center frequency $f_2$ with a second bandwidth $\Delta f_2$.

In some implementations, the second section 140 may include a plurality of shunt resonators implemented with transmission line-based resonators connected to each other by admittance inverters such that the overall response of the second section 140 has a second passband with a second center frequency $f_2$ with a second bandwidth $\Delta f_1$.

In some implementations, the second section 140 may include a plurality of transmission line stubs such that the overall response of the second section 140 has a second passband with a second center frequency $f_2$ with a second bandwidth $\Delta f_1$.

In some implementations, the number of resonators included in the first section 120 the second section 140 may be the same. For the rest of the specification, the number of resonators in the first section 120 and the second section 140 will be assumed to be the same for simplicity. However, the same concept applies to a design where the numbers of resonators in the first section 120 and the second section 140 are different. The same concept also applies to a design where there are three sections 120, 140 or more and a parametric conversion process is provided by at least one Josephson coupling element 130 between two adjacent sections 120, 140.

In some implementations, the first bandwidth $\Delta f_1$ and the second bandwidth $\Delta f_2$ may be the same. In this case, the common bandwidth will be $\Delta f$. For the remaining examples in this disclosure, the first bandwidth $\Delta f_1$ and the second bandwidth $\Delta f_2$ are assumed to be the same, $\Delta f$, for simplicity.

Figure 2:
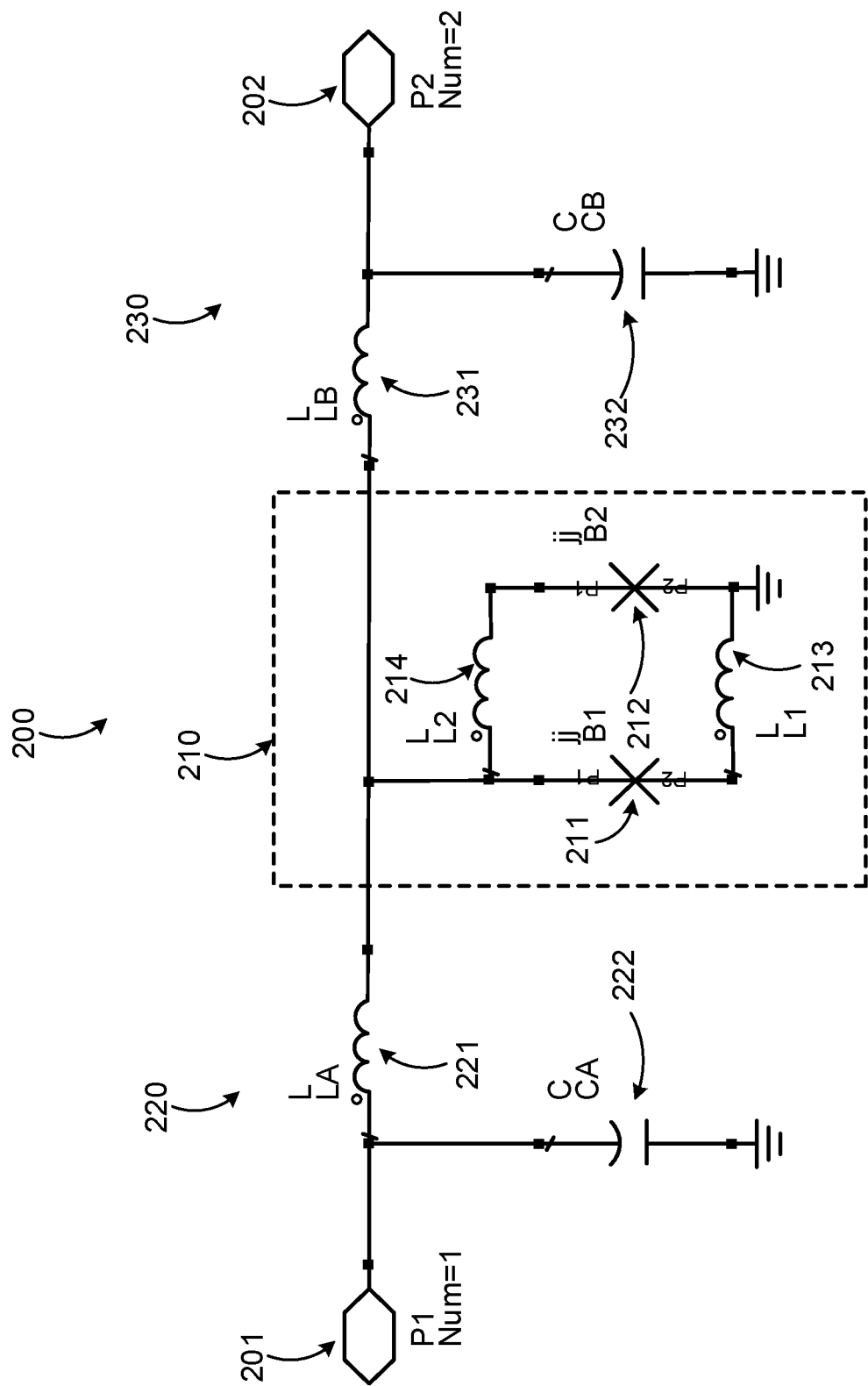
FIG. 2 is a schematic that illustrates an exemplary Josephson coupling element including a DC SQUID.

FIG. 2 is a schematic that illustrates an exemplary Josephson coupling element including a DC SQUID.

The Josephson coupling element 200 is an example of the Josephson coupling element 130 described in FIG. 1 and includes a first port 201 and a second port 202, between which a signal line is defined. This configuration of the Josephson coupling element 200 using a DC SQUID has been described previously.

The Josephson coupling element 200 can be connected to other parts of the Josephson parametric coupler 100, namely the first section 120 and the second section 140, via the first port 201 and the second port 202, respectively.

The Josephson coupling element 200 includes a DC-SQUID 210 disposed between the first port 201 and the second port 202.

The DC-SQUID 210 includes a first Josephson junction 211, labelled as B1, and a second Josephson junction 212, labelled as B2, interposed by a first inductor 213, labelled as L1 and a second inductor 214, labelled as L2. The first Josephson junction 211, the first inductor 213, the second Josephson junction 212, and the second inductor 214 are connected to each other forming a loop. The order of components in the loop may not be limited to the example of FIG. 2. For example, the positions of the first Josephson junction 211, labelled as B1 and the first inductor 213, labelled as L1 may be interchanged. The positions of the second Josephson junction 212, labelled as B2 and the second inductor 214, labelled as L2 may be interchanged.

The Josephson coupling element 130, 200 may be arranged to operate at a certain cryogenic temperature below the critical temperature of the material forming at least part of the Josephson junctions 211, 212. For example, for a Josephson junction formed using an aluminum-aluminum oxide-aluminum structure, the Josephson junction operates as described herein once the Josephson coupling element 130, 200 is disposed in an environment at a temperature below the superconducting temperature of aluminum. The Josephson parametric coupler 100 or the Josephson coupling element 130, 200 are configured to operate as described herein once disposed at a suitable cryogenic temperature.

Within the loop, a port between the first Josephson junction 211 and the second inductor 214 is connected to the signal line. A port between the second Josephson junction 212 and the first inductor 213 is connected to a ground. In other words, the DC SQUID 210 is shunted to the ground.

The example shown in FIG. 2 shows the Josephson coupling element 200 implemented with lumped elements.

The Josephson coupling element 200 further includes a first series inductor 221 and a second series inductor 231 connected in series to the signal line, on each side of the port between the first Josephson junction 211 and the second inductor 214.

The Josephson coupling element 200 further includes a first shunt capacitor 222 and a second shunt capacitor 232 connected to the signal line and shunted to the ground.

The first series inductor 221 is interposed between the first port 201 and the DC-SQUID 210.

The second series inductor 231 is interposed between the DC-SQUID 210 and the second port 202.

The first shunt capacitor 222 is interposed between the first port 201 and the first series inductor 221.

The second shunt capacitor 232 is interposed between the second series inductor 231 and the second port 202.

In some implementations, the DC-SQUID 210 may be flux-biased with a DC flux $\Phi_{DC}$ via a superconducting transformer in which the first inductor 213 (having a value L1) is the secondary winding, although the primary winding of the superconducting transformer is not shown in FIG. 2. Alternatively, the second inductor 214 (having a value L2) may be used as the secondary winding.

In some implementations, the DC-SQUID 210 may be pumped by the pump source 135 with an AC flux $\Phi_{AC}$ at frequency $f_p$ via the superconducting transformer in which the first inductor 213 is the secondary winding. Alternatively, the second inductor 214 may be used as the secondary winding. Alternatively, an additional inductor may be disposed in the superconducting loop of the DC-SQUID 210 such that the DC-SQUID 210 can be pumped by the pump source 135 with an AC flux $\Phi_{AC}$ at frequency $f_p$ via the superconducting transformer in which that additional inductor is the secondary winding.

When flux-biased with the DC flux $\Phi_{DC}$ and the AC flux $\Phi_{AC}$, the DC-SQUID 210 appears as an inductor to the connected circuit elements. The corresponding inductance $L_{SQ}$, which we will call a residual inductance, is shared between a first resonator 220 and a second resonator 230 formed within the Josephson coupling element 200 because it is shunted to the ground, as discussed above.

In the example of FIG. 2, the first resonator 220 may be formed by the first shunt capacitor 222 connected in parallel with an inductance which corresponds to the sum of the first series inductor 221 (having a value $L_A$) and the residual inductance $L_{SQ}$, i.e., $L_A+L_{SQ}$. The first resonator 220 may be formed to have the first center frequency $f_1$.

The second resonator 230 may be formed by the second shunt capacitor 232 connected in parallel with an inductance which corresponds to the sum of the second series inductor 231 (having a value of $L_B$) and the residual inductance $L_{SQ}$, i.e., $L_B+L_{SQ}$. The second resonator 230 may be formed to have the second center frequency $f_2$.

In some implementations, to design the Josephson coupling element 200 including the DC SQUID 210, the values of first series inductor $L_A$ 221, the second series inductor 231, the first shunt capacitor 222, the second shunt capacitor 232 and the residual inductance $L_{SQ}$ may be chosen such that the resonance frequency of the first resonator 220 is at $f_1$ and the resonance frequency of the first resonator is at $f_2$.

In a design where the DC-SQUID 210 is shunted to the ground, since the DC-SQUID loads other components in the Josephson parametric coupler 100 or the Josephson coupling element 130, 200, the other components may be designed taking into account the inductance of the DC-SQUID 210. Although this may be possible, the design procedure requires iterations since the inductance of the DC-SQUID 210 depends on the flux bias applied to the DC-SQUID 210, namely a DC flux $\Phi_{DC}$ and an AC flux $\Phi_{AC}$ at frequency $f_p$. Also, the parametric interaction provided by the Josephson coupling element 130, 200 is dependent on the components connected to the DC-SQUID 210.

In some implementations, after the Josephson coupling element 200 is designed, The Josephson coupling element 200 may be interposed between the first section 120 and the second section 140. For example, in a 4-pole band-pass network, two of the poles are represented by the first resonator 220 and the second resonator 230 included in the Josephson coupling element 200 described herein and an additional resonator can be added on each side of the Josephson coupling element 200, to the first port 201 and the second port 202, via an admittance inverter. The additional resonator connected to the first port 201 can also be configured to have a resonance frequency $f_1$ and the additional resonator connected to the second port 202 can be configured to have a resonance frequency $f_2$.

Figure 3:
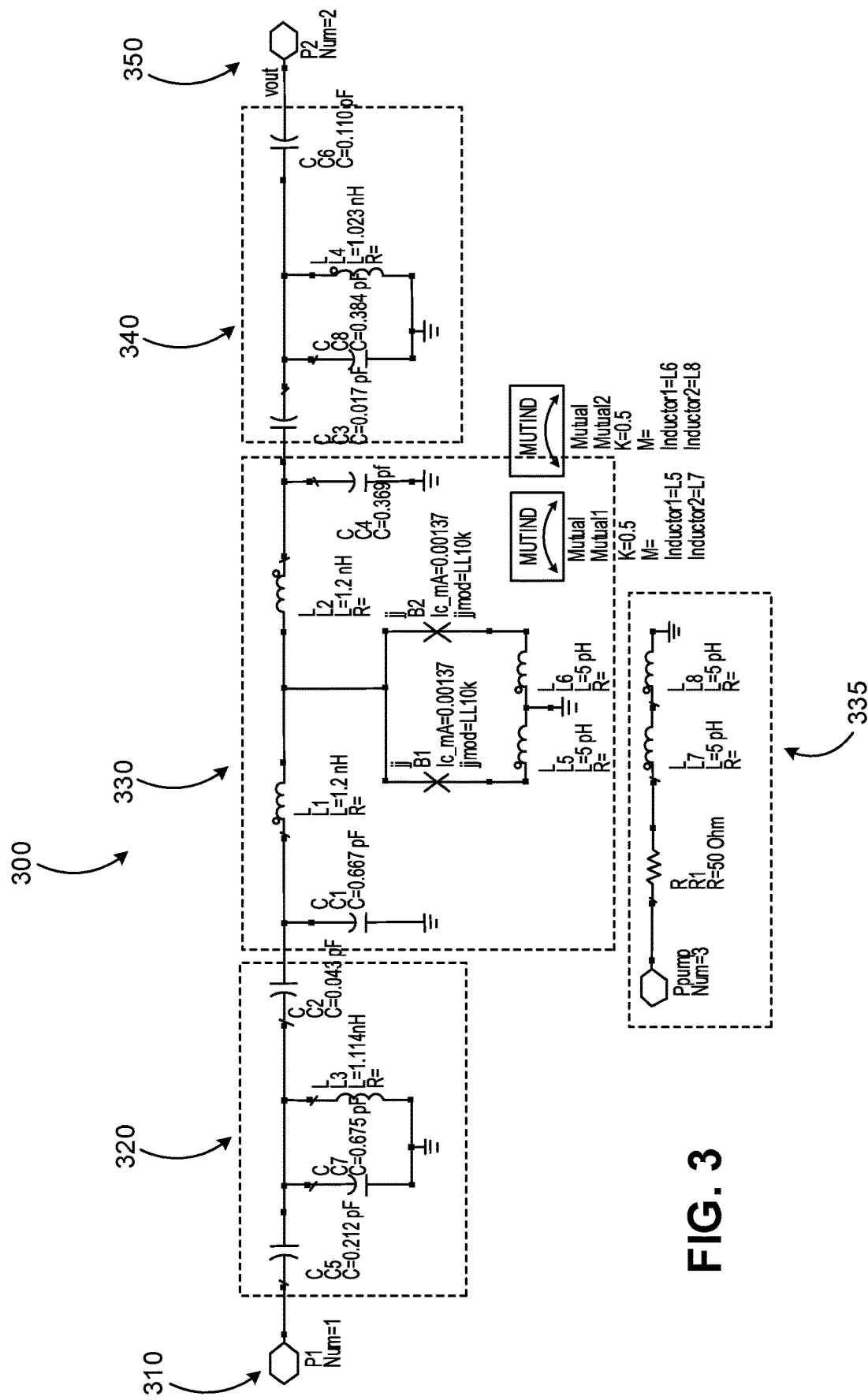
FIG. 3 is a schematic that illustrates an exemplary Josephson parametric coupler.

FIG. 3 is a schematic that illustrates an exemplary Josephson parametric coupler.

The Josephson parametric coupler 300 includes the input port 310, the first section 320, the Josephson coupling element 330, the pump source 335, the second section 340, and the output port 350.

In the example of FIG. 3, the Josephson parametric coupler 300 is implemented with lumped elements.

In FIG. 3, the first section 320, the Josephson coupling element 330, the pump source 335, and the second section 340 are demarcated with dotted lines.

The Josephson coupling element 330 is interposed between and electrically connected to the first section 320 and the second section 340. The Josephson coupling element 330 may be designed and operate in a similar fashion as the Josephson coupling element 200 as described in FIG. 2.

The first section 320 and the second section 340 are parametrically and inductively coupled via the Josephson coupling element 330. The reactance of the Josephson coupling element 330 is modulated by a pump tone provided by the pump source 335.

Each of the first section 320 and the second section 340 includes a shunt LC resonator with an admittance inverter on each side of the shunt LC resonator.

The first section 320 includes a shunt LC resonator formed by a capacitor labelled C7 and an inductor labelled L3. The shunt LC resonator of the first section 320 is arranged to have the first center frequency $f_1$.

The second section 340 includes a shunt LC resonator formed by a capacitor labelled C8 and an inductor labelled L4. The shunt LC resonator of the second section 340 is arranged to have the second center frequency $f_2$.

In the example of FIG. 3, the Josephson parametric coupler 300 is designed such that $f_1$=5 GHz, $f_2$=7 GHz, $\Delta f$=400 MHz. The first section 320 is designed to have a passband with a center frequency of 5 GHz and the second section 340 is designed to have a center frequency 7 GHz. Therefore, when a signal with a first frequency $f_1$=5 GHz is input into the first port 310, this signal is converted into a signal with a second frequency $f_2$=7 GHz and outputted at the second port 350.

The Josephson coupling element 330 can be operated such that when an appropriate pump tone is provided from the pump source 335, a signal at 5 GHz is converted into a signal at 7 GHz at the Josephson coupling element 330.

Figure 4B:
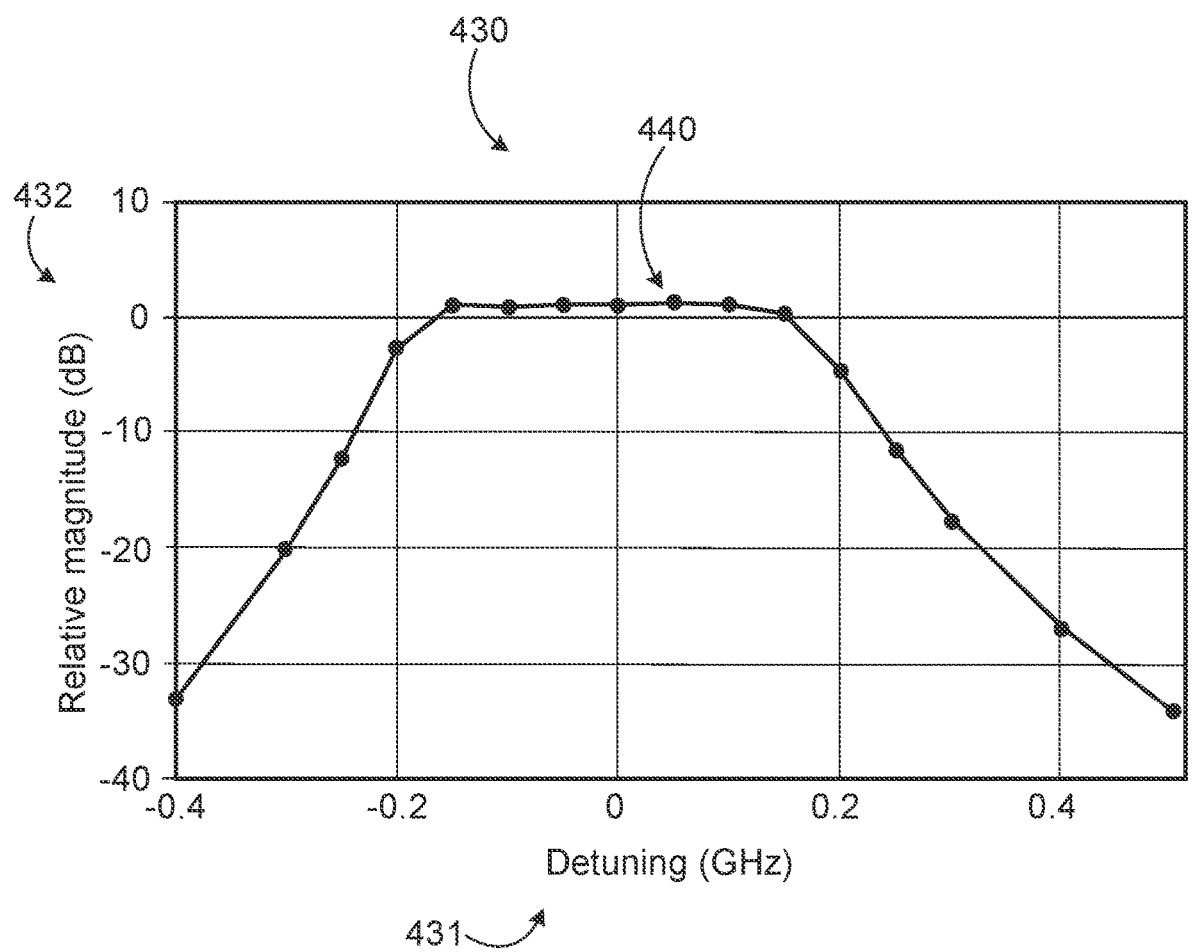

FIGS. 4a and 4b show a simulation result of the Josephson parametric coupler described in FIG. 3 with references to FIGS. 1 to 3.

FIG. 4a shows a panel 400 which includes a result of the simulation performed with the harmonic balance simulation package within the Keysight ADS program, where a SQUID is simulated as a symbolically-defined device.

An x-axis 401 of the panel 400 represents detuning of frequency in GHz. A y-axis 402 of the panel 400 represents a relative magnitude in dB.

In this example, the values of the components of the first section 320 and the second section 340 were chosen such that the Josephson parametric coupler 300 has an overall response of a 4-pole Chebychev response with 400 MHz bandwidth. The corresponding flux biases applied to the DC-SQUID 210 included within the Josephson coupling element, 200, 330, when the DC-SQUID 210 operates as a parametric frequency converter, are evaluated to be that the DC flux $\Phi_{DC}$=0.224 $\Phi_0$ and the AC flux $\Phi_{AC}$=0.2 $\Phi_0$.

A first curve 410 represents a relative magnitude of power reflected at the input port 310. For the first curve 410, the x-axis 401 is with respect to $f_1$=5 GHz.

A second curve 420 represents a relative magnitude of power outputted at the output port 350. For the second curve 420, the x-axis 401 is with respect to f2=7 GHz.

The first curve 410 shows over roughly 400 MHz bandwidth around 0 GHz detuning, the reflection of the power at the input port 310 decreases by more than 20 dB. This shows that the input match of the Josephson parametric coupler 300 is better than 20 dB.

The second curve 420 shows over approximately 350 MHz bandwidth, a similar width of the bandwidth shown by the first curve 410, the Josephson parametric coupler 300 outputs a power with a conversion gain of approximately 1 dB. This value is consistent with the results of the Manley-Rowe relation that predicts conversion gain of $10 \times \log_{10}(7/5)$=1.46 dB.

The second curve 420, in view of the first curve 410 demonstrates a complete frequency conversion between two bands, namely $\Delta f$ around $f_1$ to $\Delta f$ around $f_2$ with $f_1$=5 GHz, $f_2$=7 GHz, $\Delta f$=350 MHz with a flat response over the bandwidth.

FIG. 4b shows a panel 430 which includes a result of the simulation performed with the WRSpice program, which includes a model for simulating Josephson junction. The simulation was performed in a transient mode, where the time domain output was demodulated numerically to obtain the signal magnitude at the device output port 350.

An x-axis 431 of the panel 430 represents detuning of frequency in GHz. A y-axis 432 of the panel 400 represents a relative magnitude in dB.

A curve 440 represents a relative magnitude of power outputted at the output port 350. For the curve 440, the x-axis 401 is with respect to $f_2$=7 GHz.

The curve 440 shows that over approximately 350 MHz bandwidth, a similar width of the bandwidth shown by the simulation results shown in FIG. 4a, the Josephson parametric coupler 300 outputs a power with a flat response with a conversion gain of approximately 1 dB. Both simulation techniques, shown in FIGS. 4a and 4b, are in good agreement, and agree with the design target for the circuit, $f_1$=5 GHz, $f_2$=7 GHz, $\Delta f$=400 MHz.

In the designs shown in FIGS. 2 and 3, since the DC-SQUID 210 is shunted to the ground, the DC-SQUID loads other components in the Josephson parametric coupler 100 or the Josephson coupling element 130, 200. Therefore, the other components may be designed considering the inductance of the DC-SQUID 210. Although this may be possible, the design procedure may not be straightforward because the inductance of the DC-SQUID 210 depends on the flux bias applied to the DC-SQUID 210, namely a DC flux $\Phi_{DC}$ and an AC flux $\Phi_{AC}$ at frequency $f_p$. Also, the parametric interaction provided by the Josephson coupling element 130, 200 is dependent on the components connected to the DC-SQUID 210.

For this reason, the design of the Josephson parametric coupler 300 as shown in FIG. 3 may be difficult because within the Josephson coupling element 130, 200, 330, the first resonator 220 and the second resonator 230 are coupled passively via the first Josephson junction 211 and the second Josephson junction 212 in addition to the parametric coupling provided by the Josephson junction coupling element 210, 330. In other words, since the DC-SQUID 210 is shunted to the ground, the second resonator 230 does not present an open-circuit impedance in the passband of the first resonator 220, and vice versa, and the first and second resonators 220, 230 effectively load each-other. Furthermore, the interdependence between all components here may make the design and operating margins small.

Therefore, in the design described FIGS. 2 and 3, in which the Josephson junction coupling element 200, 330, includes a DC-SQUID 210, an approximation was used for the first inductance $L_{SQ}$, the loaded inductance of the DC-SQUID 210 to facilitate the design. Once a design sufficiently close to target is obtained with the approximated value of the loaded inductance of the DC-SQUID 210, a further tuning of element values may be required to optimize the response of the Josephson parametric coupler 300.

The disclosure below relates to the design of the Josephson parametric coupler 100, 300, which addresses these issues. In particular, the Josephson coupling element 130, 200, 330 is designed to include a RF-SQUID.

Figure 5:
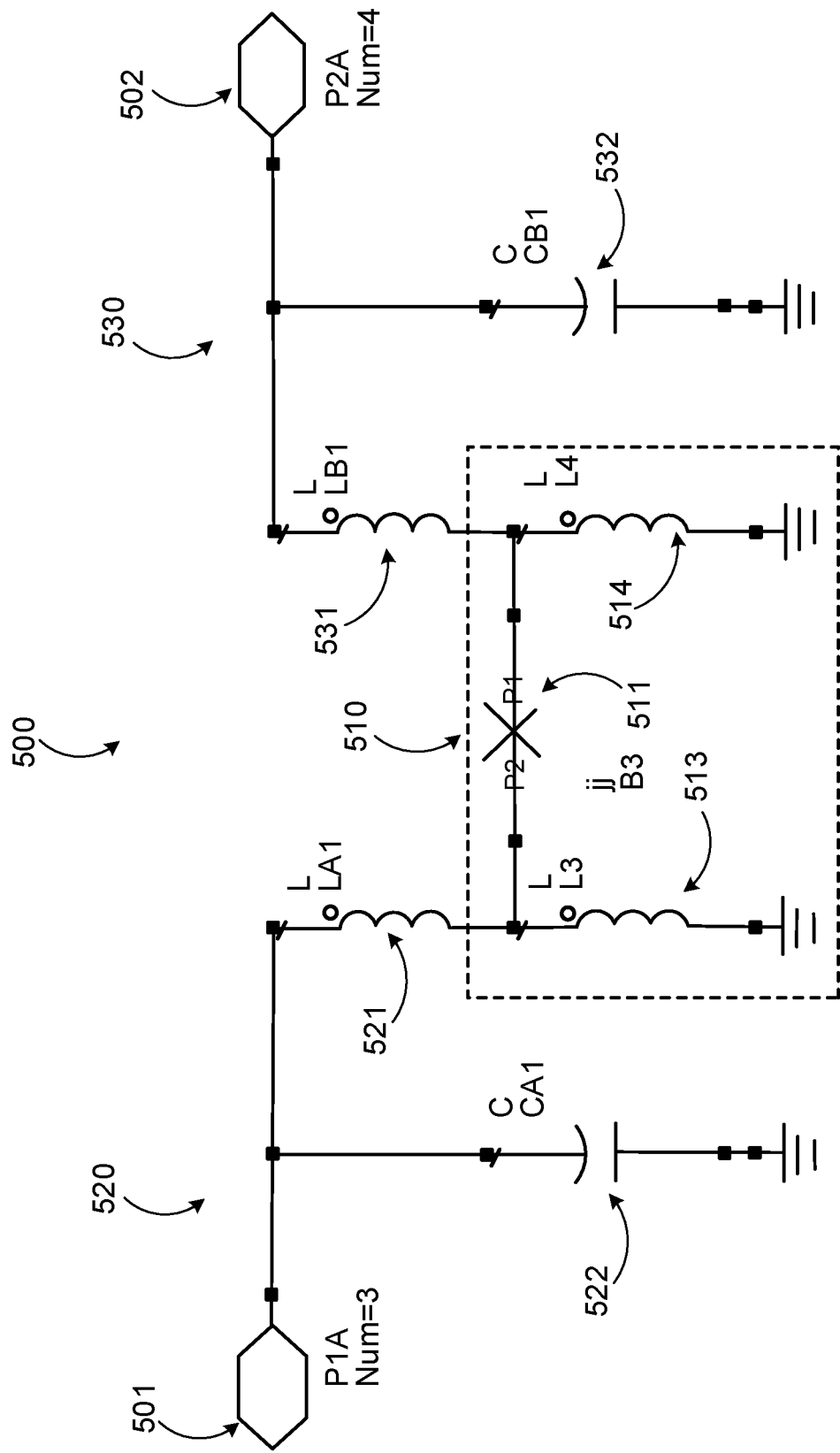
FIG. 5 is a schematic that illustrates an exemplary Josephson coupling element.

FIG. 5 is a schematic that illustrates an exemplary Josephson coupling element with references to FIG. 1.

The Josephson coupling element 500 includes a first port 501 and a second port 502, between which a signal line is defined.

The Josephson coupling element 500 can be connected to other parts of the Josephson parametric coupler 100 via the first port 501 and the second port 502, respectively.

The Josephson coupling element 500 includes a RF-SQUID 510 disposed between the first port 501 and the second port 502. The RF-SQUID 510 is in demarcated with dotted lines in FIG. 5.

The RF-SQUID 510 includes a Josephson junction 511, labelled as B3, interposed by a first inductor 513, labelled as L3 and a second inductor 514, labelled as L4.

A port between the Josephson junction 511 and the first inductor 513 is connected to the signal line towards the first port 501. A port between the Josephson junction 511 and the second inductor 514 is connected to the signal line towards the second port 502. The first inductor 513 and the second inductor 514 are connected to a ground. The Josephson junction 511, the first inductor 513, the ground and the second inductor 514 form a loop in this order.

The example shown in FIG. 5 shows the Josephson coupling element 500 implemented with lumped elements.

The Josephson coupling element 500 further includes a first series inductor 521 and a second series inductor 531 connected in series to the signal line.

The Josephson coupling element 500 further includes a first shunt capacitor 522 and a second shunt capacitor 532 connected to the signal line and shunted to the ground.

The first series inductor 521 is interposed between the first port 501 and the RF-SQUID 510.

The second series inductor 531 is interposed between the RF-SQUID 510 and the second port 502.

The first shunt capacitor 522 is interposed between the first port 501 and the first series inductor 521.

The second shunt capacitor 532 is interposed between the second series inductor 531 and the second port 502.

In the example of FIG. 5, a first resonator 520 may be formed by the first shunt capacitor 522, the first series inductor 521 and the first inductor 513. The first resonator 520 may be formed to have the first center frequency $f_1$.

The second resonator 530 may be formed by the second shunt capacitor 532, the second series inductor 531 and the second inductor 514. The second resonator 530 may be formed to have the second center frequency $f_2$.

In some implementations, the RF-SQUID 510 may be arranged such that the reduced inductance $\beta_L$ of the RF-SQUID 510 is less than 1, $\beta_L < 1$. The reduced inductance $\beta_L$ is defined as $$\beta_L = \frac{2\pi I_C L}{\Phi_0},$$

where L is the loop inductance and $\Phi_0$ is the magnetic flux quantum. L, the loop inductance, corresponds to the sum of the inductance values of the first inductor 513 and the second inductor 514, namely L3+L4.

This condition corresponds to n=0 flux quantum state, in which no stable flux quantum states are found in the loop of the RF-SQUID 510. This condition may be achieved by adjusting the inductance values of the first inductor 513 and the second inductor 514, namely L3 and L4 or varying the geometry of the Josephson junction 511 to control the critical current $I_C$.

In some implementations, the RF-SQUID 510 may be pumped by the pump source 135 with an AC flux $\Phi_{AC}$ at frequency $f_p$ via the superconducting transformer in which the first inductor 513 (having a value of L3) is the secondary winding.

Alternatively, in some implementations, the RF-SQUID 510 may be pumped by the pump source 135 with an AC flux $\Phi_{AC}$ at frequency $f_p$ via the superconducting transformer in which the second inductor 514 (having a value of L4) is the secondary winding.

Alternatively, in some implementations, an additional inductor may be disposed in the superconducting loop of the RF-SQUID 510 such that the RF-SQUID 510 can be pumped by the pump source 135 with an AC flux $\Phi_{AC}$ at frequency $f_p$ via the superconducting transformer in which that additional inductor is the secondary winding.

In some implementations, the RF-SQUID 510 may be flux-biased with a DC flux bias $\Phi_{DC}$ via a superconducting transformer in which the first inductor 513 (having a value of L3) or second inductor 514 (having a value of L4) is the secondary winding although the primary winding of the superconducting transformer is not shown in FIG. 5.

Alternatively, in some implementations, the RF-SQUID 510 may be flux-biased with a DC flux bias $\Phi_{DC}$ by applying magnetic field traversing through the RF-SQUID 510.

The inductance of the Josephson junction 511 depends on the DC flux bias $\Phi_{DC}$ applied to the RF-SQUID 510. When the RF-SQUID 510 is biased with the DC flux bias $\Phi_{DC}$ such that the equilibrium phase $\delta_0$ across the junction is $\pi/2$, the effective inductance of the Josephson junction 511 diverges. This condition depends on the reduced inductance of the RF-SQUID 510, defined as $$\beta_L = \frac{2\pi I_C L}{\Phi_0}$$

and is defined by the relation $$\frac{\Phi_0}{2\pi}\delta_0 + L I_c \sin\delta_0 = \Phi_{DC}.$$

As discussed above, in some implementations, the RF-SQUID 510 may be arranged such that the reduced inductance of the RF-SQUID 510 is less than 1, $\beta_L < 1$. For example, if $\beta_L = 0.9$, the effective inductance of the Josephson junction 511 diverges at $\Phi_{DC} = 0.39\ \Phi_0$. When the effective inductance of the Josephson junction 511 diverges, the passive inductive coupling between the first resonator 520 and the second resonator 530 vanishes and the coupling provided by the Josephson coupling element 500 becomes purely parametric if there is a AC flux provided at frequency $f_p$. For a DC flux, the coupling vanishes.

In this case, the first and second resonators 520, 530 appear to be an open-circuit impedance at the other resonator's frequency band and there are no parasitic interactions between the first section 120 and the second section 140. This allows for treating the two segments of the bandpass filters 120, 140 and the RF SQUID 510 as separate elements in designing the filter. The design process may be therefore simplified significantly because all circuit elements can be calculated without trial and error or iterations. At the same DC flux for which the effective inductance of the Josephson junction 511 diverges, the slope of the curve representing inductance versus flux is maximized. Therefore, parametric pumping is also most efficient at this operating point.

In some implementations, after the Josephson coupling element 500 is designed, The Josephson coupling element 500 may be interposed between the first section 120 and the second section 140. For example, in a 4-pole band-pass network, two of the poles are represented by the first resonator 520 and the second resonator 530 included in the Josephson coupling element 500 described above and one more resonator can be added one each side of the Josephson coupling element 500, to the first port 501 and the second port 502, via an admittance inverter, as will be described in more detail later. The additional resonator connected to the first port 501 via a first admittance inverter can be configured to have a resonance frequency $f_1$ and the additional resonator connected to the second port 502 via a second admittance inverter can be configured to have a resonance frequency $f_2$.

The method of designing the Josephson parametric coupler 100, 300 will be described below, with constructing a 4-pole band-pass network as an example.

Figure 6:
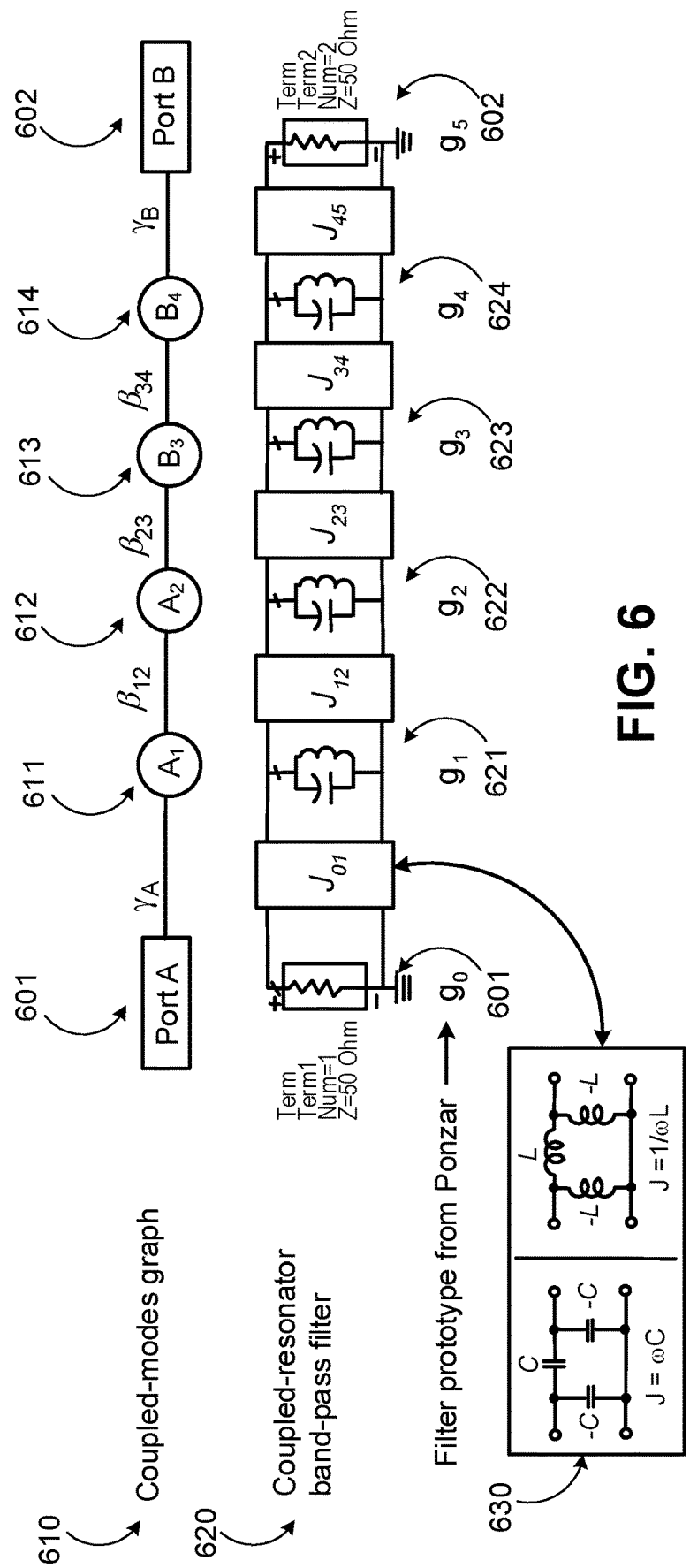
FIG. 6 is a diagram that illustrates a design concept of a Josephson parametric coupler.

FIG. 6 is a diagram that illustrates a design concept of a Josephson parametric coupler.

The Josephson parametric coupler 100, 300 can be designed by finding correspondence between a passive filter synthesis method and a coupled-mode theoretical approach describing parametric coupled-mode systems. The coupled-mode theory has origins in quantum optics and has been successful in the design of non-reciprocal parametric devices. The passive band-pass filter design theory has been an engineering practice for decades. Using both of these descriptions to address any system of coupled resonators, whether the coupling is passive or parametric, allows us to use established engineering techniques to design broadband parametric devices such as the Josephson parametric coupler 100, 300.

In particular, the method described below may provide a method for calculating S-parameters for an arbitrary system of coupled resonators, where ports could be at different frequencies and the coupling coefficient can be complex, as is the case for the Josephson parametric coupler 100, 300. The method will be described with an example of a 4-pole bandpass filter formed with coupled resonators.

A first diagram 610 is a graph illustrating a coupled-mode theory representation of a 4-pole bandpass filter network. The first diagram 610 shows a first resonator 611, a second resonator 612, a third resonator 613 and a fourth resonator 614 connected in series, in this order. Each resonator, 611, 612, 613, 614 is represented by a node in the graph. An input port 610, labelled as port A, is connected to the first resonator 611 and an output port 602, labelled as port B is connected to the fourth resonator 614. In this example, four modes are considered: mode A1 and A2 at frequency $\omega_A$, at the first resonator 611 and the second resonator 612, respectively and mode B3 and B4 at frequency $\omega_B$, at the third resonator 613 and the fourth resonator 614, respectively. These four modes 611, 612, 613, 614 are coupled, and the arrangement is assumed to have a bandwidth $\Delta\omega$ as a design requirement to determine the coupling strength. Mode A1 is coupled to the input port 601 external port with a rate $\gamma_A$, and mode B4 is coupled to the output port 602 with a rate $\gamma_B$. For internal modes that are not connected to ports, namely the modes of the resonators 612, 613 we set the decay rate to be $\gamma=0$. It is likewise assumed that the modes of the resonators 611, 614 have no internal loss, and their associated decay rates, $\gamma_A$ and $\gamma_B$, are solely due to their coupling to the ports 601, 602. This is an approximation which reflects the fact that the resonators 611, 612, 613, 614 are superconducting and have very low internal loss. Also, it is set that $\gamma_A=\gamma_B$ for Chebychev and Butterworth prototypes which can be used for this embodiment. For example, the frequencies of the modes can be chosen to be $\omega_A=5$ GHz and $\omega_B=7$ GHz. The bandwidth of the arrangement $\Delta\omega$ can be set to be a fractional bandwidth of 5% around $\omega_B$, which is 350 MHz.

The coupling coefficient representing the coupling between the resonators 611, 612, 613, 614 is labelled by $\beta_{ij}$ and the resonators 611, 612, 613, 614 are each connected to neighboring resonators or input/output ports 601, 602. For example, the coupling coefficient between the first resonator 611 and the second resonator 612 is $\beta_{12}$. In our example of the Josephson parametric coupler 100, 300, the coupling between the second resonator 612 and the third resonator 613, represented by $\beta_{23}$, corresponds to the parametric interaction provided by the Josephson coupling element 130, 200, 330, 500. If $\beta_{23}=\beta^*_{23}$, $\beta_{23}$ corresponds to a parametric coupling provided by a Josephson parametric converter. In particular, a real positive $\beta_{23}$ corresponds to a passive coupling. If $\beta_{23}=-\beta^*_{32}$, $\beta_{23}$ corresponds to a parametric coupling provided by a Josephson parametric amplifier. These rules are a consequence of the pump flux at $f_p=f_2-f_1$ for parametric converters, and $f_p=f_1+f_2$ for parametric amplifiers. These rules are outlined in F. Lecocq, L. Ranzani, G. A. Peterson, K. Cicak, R. W. Simmonds, J. D. Teufel, and J. Aumentado, Phys. Rev. Applied 7, 024028 (2017).

A second diagram 620 illustrates a design methodology of bandpass filter network. Band pass filter design begins with selecting the required transmission profile, from which we can choose the desired number of filter sections N, the filter's center frequency $\omega_0$, fractional bandwidth $$\frac{\Delta\omega}{\omega_0},$$

and response type such as Chebyshev or Butterworth response functions. In our example of the Josephson parametric coupler 100, 300, the number of filter sections N=4. Then corresponding normalized filter coefficients, or normalized element values, $g_0$ to $g_{N+1}$, $g_0$ to $g_5$, can be found from a table, which is available as a practice in the field of microwave engineering. Coefficient $g_0$ is usually omitted from tables, and usually $g_0=1$ by definition, representing the conductance of the source at the input port 601. The last coefficient, $g_5$, represents the conductance of the load at the output port 602. Once the normalized filter coefficients $g_0$ to $g_5$ are specified, four resonators corresponding to N=4, are designed. As in the example of FIG. 5, the resonators may be constructed as lumped element LC resonators, namely a first shunt resonator 611, 621, a second shunt resonator 612, 622, a third shunt resonator 613, 623, a fourth shunt resonator 614, 624 with characteristic impedances $Z_1$ to $Z_4$. The first shunt resonator 611, 621 and the second shunt resonator 612, 622 may be designed to have a resonance frequency at f1 and the third shunt resonator 613, 623 and the fourth shunt resonator 614, 624 may be designed to have a resonance frequency at f2. Only if all couplings are passive, f1=f2 and this frequency can be the center frequency of the filter $\omega_0$. The shunt resonators 611, 621, 612, 622, 613, 623, 614, 624 are then connected form a one-dimensional network as shown in the second diagram 620 via synthesized admittance inverters $J_{ij}$. For example, the second shunt resonator 622 and the third shunt resonator 623 are connected via an admittance inverter $J_{23}$ and the input port 601 and the first shunt resonator 621 are connected via an admittance inverter $J_{01}$.

As shown in the panel 630 of FIG. 6 pointing to the admittance inverter $J_{01}$, the admittance inverters may be constructed as a network of capacitors or inductors. However, the implementation of the admittance inverters is not limited to these examples. The admittance inverters may be implemented as quarter-wave transformers, transmission lines and reactive elements. The admittance value of each admittance inverter is determined by the characteristic impedance and the normalized filter coefficients of the shunt resonators and/or the input and output ports 601, 602 connected by the admittance inverter, given by $$J_{ij} = \frac{\Delta\omega/\omega_0}{\sqrt{Z_i Z_j g_i g_j}}.$$

For example, the admittance of the admittance inverter connecting the input port 601 and the first shunt resonator 621 is $$J_{12} = \frac{\Delta\omega/\omega_0}{\sqrt{Z_1 Z_2 g_1 g_2}},$$

and the capacitors or inductors can be chosen accordingly to construct the admittance inverter $J_{12}$.

In the design methodology of bandpass filter network, the procedures described above provide fully prescribed S-parameters, the elements of a scattering matrix S, for a system of coupled resonators. However, it is noted that only a single center frequency $\omega_0$ can be used for the design, in contrast to the coupled-mode theory representation shown in the first diagram 610. In other words, although the position of the admittance inverter $J_{23}$ corresponds to the position of the Josephson coupling element 130, 200, 330, 500 within the Josephson parametric coupler 100, 300, the design methodology cannot describe the parametric coupling which relates to conversion between two frequencies. In other words, since the admittance inverters are all passive, a coupling between resonators having different frequencies cannot be provided.

To address this issue, this specification provides a method by establishing a correspondence between the coupled-mode description and the filter theory description.

The correspondence between the coupled-mode theory description and the filter theory description as shown in FIG. 6 can be made by $$\gamma_A = \frac{\Delta\omega}{g_0 g_1}, \gamma_B = \frac{\Delta\omega}{g_4 g_5} \text{ and } \beta_{ij} = \frac{\Delta\omega}{2\gamma\sqrt{g_i g_j}}, \text{ where } \gamma = \gamma_A = \gamma_B.$$

In other words, the coupling coefficients $\beta_{ij}$ from the coupled-mode theory can be evaluated in terms of the normalized filter coefficients $g_i$ from the filter design theory, and are related to the inverter values $J_{ij}$.

The procedures described so far can be applied to designing a Josephson parametric coupler 100, 300, for example, built with a 4-pole Chebyshev network with 0.01 dB ripple. From N=4, the normalized filter coefficients found from a design table are: $g_0=1.0$, $g_1=0.7128$, $g_2=1.2003$, $g_3=1.3212$, $g_4=0.6476$, and $g_5=1.1007$. In the first diagram 610, which represents a graph for the coupled-mode theory, the frequencies of the modes are chosen to be $\omega_A=5$ GHz and $\omega_B=7$ GHz. The bandwidth of the network $\Delta\omega$ is chosen to be a fractional bandwidth of 5% around $\omega_B$, which is 350 MHz. Then $\gamma=\gamma_A=\gamma_B=491$ MHz, $\beta_{12}=0.385$ and $\beta_{23}=0.283$. The admittance of the admittance inverters $J_{ij}$ can either be directly evaluated from the normalized filter coefficients $g_0$ to $g_5$ or using $\gamma$ and $\beta_{ij}$ values.

Once the resonators 621, 622, 623, 624 are designed and the coupling coefficients are determined, the operating condition of the Josephson coupling element 130, 200, 330, 500 can be determined based on the prescribed coupling coefficient between the second shunt resonator 622 and the third shunt resonator 623, $\beta_{23}=0.283$.

As discussed in FIG. 5, the DC flux operating point can be determined by $$\Phi_{DC} = \frac{1}{4}\Phi_0 + LI_c,$$

where L is the loop inductance, to let the inductance of the Josephson junction 511 diverge. The coupling coefficient $\beta_{23}$ is related to the amplitude of modulation of the mutual inductive coupling $M_{23}$ between the second shunt resonator 622 and the third shunt resonator 623 by $$\beta_{23} = \frac{1}{2\gamma}\frac{\Phi_{ac}}{8}\frac{dM_{jk}}{d\Phi}\sqrt{\frac{\omega_j\omega_k}{L_j L_k}}$$

with i=2, j=3, rearranging a result given in F. Lecocq et al., Phys. Rev. Applied 7, 024028 (2017), which describes parametric interaction between two resonators. $\Phi_{ac}$ is the pump amplitude of the AC flux induced in the RF SQUID by a pump current provided by the pump source 135. $L_j$ and $L_k$, the inductance values of the resonators were either selected when designing the resonance frequency or in case the resonators are not implemented with lumped elements, can be calculated from the resonance frequency and the impedance of each resonator.

$$\frac{dM_{jk}}{d\Phi}$$

corresponds to the slope of the mutual inductive coupling, between resonators j and k, with respect to flux bias applied to the Josephson coupling element 500. Calculating $$\frac{dM_{jk}}{d\Phi}$$

depends only on the junction critical current/c and the linear inductance L of the RF-SQUID 510. The mutual coupling M is given by $M=L_g^2/(L_j+2L_g)$ where $L_j$ corresponds to the junction inductance proportional to $1/\cos\delta_0$ and $L_g$ is the inductance values of the first inductor 513 and the second inductor 514, L3 and L4, when they are set to be the same. Since all other terms are known, $\Phi_{ac}$ can be calculated by $$\Phi_{ac} = \frac{16\gamma\beta_{23}}{\frac{dM_{jk}}{d\Phi}}\sqrt{\frac{L_j L_k}{\omega_j\omega_k}},$$

which gives during the operation the desired $\beta_{23}$ from the above relation.

The procedure described above provides a method for synthesizing a bandpass network for a Josephson parametric coupler 100, 300. The procedure also provides a method for calculating S-parameters for an arbitrary system of coupled resonators without trial and error or iteration, where the ports could be at different frequencies as is the case for parametric processes, and the couplings can be complex.

Although the procedure was explained with an example of the case N=4, the concept applies to any arbitrary number of resonators or poles.

Figure 7:
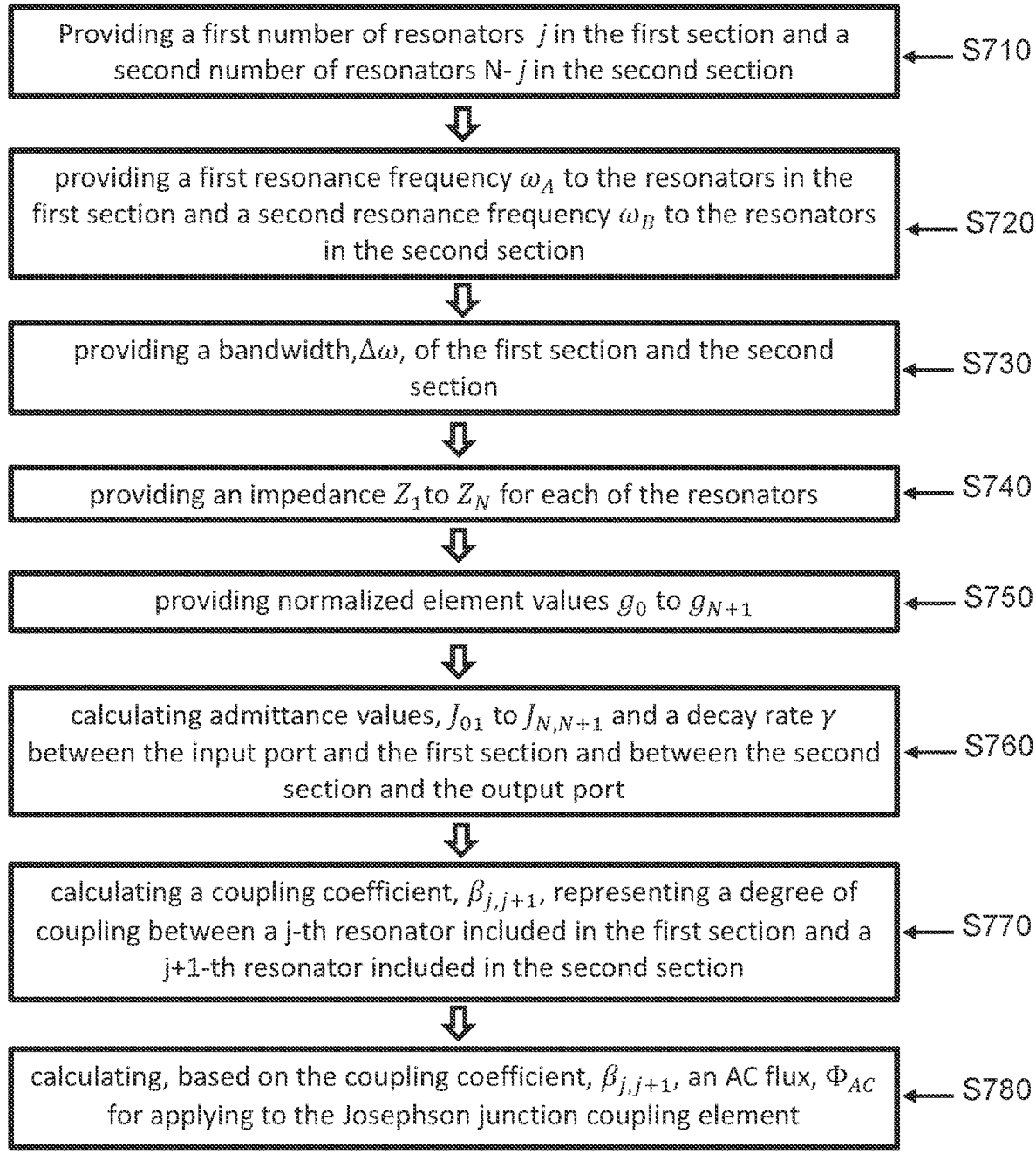
FIG. 7 is a flowchart that illustrates an exemplary procedure of designing a Josephson parametric coupler.

FIG. 7 is a flowchart which illustrates an exemplary procedure of designing a Josephson parametric coupler with references to FIG. 6.

In step S710, a first number of resonators j in the first section and a second number of resonators N-j in the second section are provided. In the example of FIGS. 6, N=2 and j=2.

In step S720, providing a first resonance frequency $\omega_A$ to the resonators in the first section and a second resonance frequency $\omega_B$ to the resonators in the second section. In the example of FIG. 6, the frequencies of the modes are chosen to be $\omega_A$=5 GHz and $\omega_B$=7 GHz.

In step S730, a bandwidth $\Delta\omega$ of the first section and the second section is provided. In the example of FIG. 6, the bandwidth $\Delta\omega$ is chosen to be a fractional bandwidth of 5% around $\omega_B$, which is 350 MHz.

In step S740, an impedance $Z_1$ to $Z_N$ for each of the resonators is provided. In case the shunt resonators 621, 622, 623, 624 are constructed as LC resonators with lumped elements, the impedance $Z_1$ to $Z_N$ is determined when the inductance value and the capacitance value are chosen.

In practice, once the resonance frequencies of the j-th and (j+1)-th resonators which are parametrically coupled, are selected in step S720, the capacitance values and the inductance values can be chosen. This also determines the impedances of these two resonators, as in step S740. The resonance frequencies of the resonators in the first section are determined to be the same as those of, respectively, which corresponds to the step S720.

In step S750, normalized element values $g_0$ to $g_{N+1}$ are provided. $g_0$ represents a normalized impedance at the input port, $g_{N+1}$ represents a normalized impedance at the output port, and $g_1$ to $g_N$ represent normalized impedances of the N resonators, In the example of FIG. 6 where N=4, the normalized filter coefficients found from a design table are: $g_0$=1.0, $g_1$=0.7128, $g_2$=1.2003, $g_3$=1.3212, $g_4$=0.6476, and $g_5$=1.1007 for a Chebyshev response.

In step S760, admittance values, $J_{01}$ to $J_{N,N+1}$ and a decay rate $\gamma$ between the input port and the first section and between the second section and the output port are evaluated by $$J_{ij} = \frac{\Delta\omega/\omega_0}{\sqrt{Z_iZ_jg_ig_j}} \text{ and } \gamma_A = \frac{\Delta\omega}{g_0g_1}, \gamma_B = \frac{\Delta\omega}{g_Ng_{N+1}}, \text{ where } \gamma = \gamma_A = \gamma_B.$$

The admittance inverters can be constructed accordingly, for example, by choosing the inductance value or the capacitance value.

In step S770, a coupling coefficient, $\beta_{j,j+1}$ is calculated, which represents a degree of coupling between a j-th resonator included in the first section and a j+1-th resonator included in the second section $$\beta_{j,j+1} = \frac{\Delta\omega}{2\gamma\sqrt{g_jg_{j+1}}}.$$

In step S780, based on the coupling coefficient, $\beta_{j,j+1}$, an AC flux, $\Phi_{AC}$ for applying to the Josephson junction coupling element is calculated by $$\Phi_{ac} = \frac{16\gamma\beta_{23}}{\frac{dM_{jk}}{d\Phi}}\sqrt{\frac{L_jL_k}{\omega_j\omega_k}},$$

when DC flux, $\Phi_{DC}$ applied to the Josephson junction coupling element is given by $$\Phi_{DC} = \frac{1}{4}\Phi_0 + LI_c$$

for example, to the Josephson junction coupling element 510 of the Josephson parametric coupler 500 described in FIG. 5. L is the linear inductance of the Josephson junction coupling element, $I_C$ is the critical current of the Josephson junction, $\Phi_0$ is the magnetic flux quantum, $$\frac{dM_{j,j+1}}{d\Phi}$$

is the slope of the mutual inductive coupling between j-th resonator and (j+1)-th resonator with respect to flux bias applied to the Josephson coupling element, $L_j$ and $L_{j+1}$ are the inductance values of the j-th resonator and (j+1)-th resonator, respectively.

Figure 8:
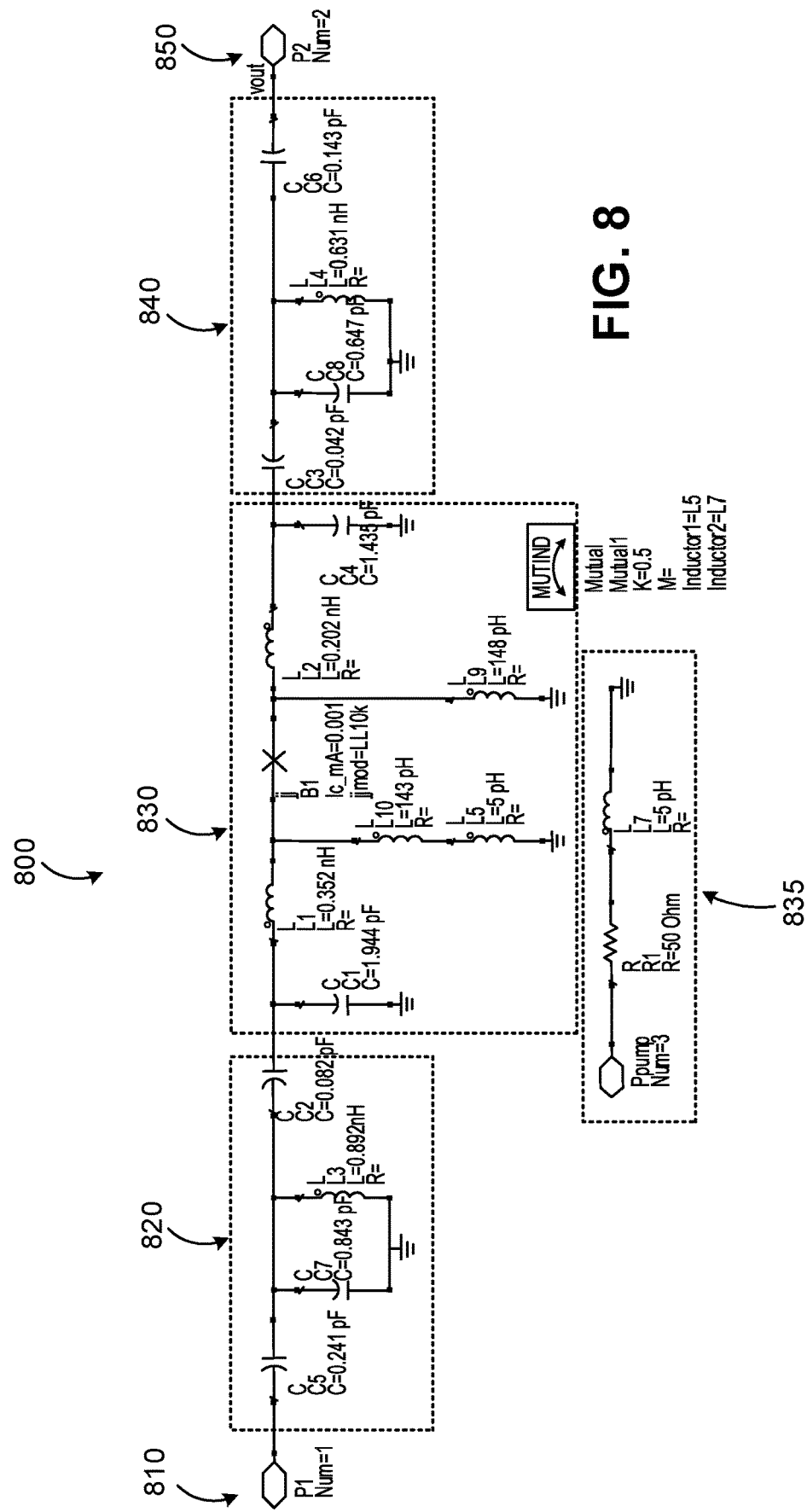
FIG. 8 is a schematic that illustrates an exemplary Josephson parametric coupler where a coupling is provided by a Josephson parametric converter.

FIG. 8 is a schematic that illustrates an exemplary Josephson parametric coupler. In particular, FIG. 8 shows the Josephson parametric coupler 800 constructed according to the procedure of FIG. 7.

The Josephson parametric coupler 800 includes the input port 810, the first section 820, the Josephson junction coupling element 830, the pump source 835, the second section 840, and the output port 850.

In the example of FIG. 8, the Josephson parametric coupler 800 is implemented with lumped elements.

In FIG. 8, the first section 820, the Josephson coupling element 830, the pump source 835, and the second section 840 are demarcated with dotted lines.

The Josephson coupling element 830 is interposed between and electrically connected to the first section 820 and the second section 840. The Josephson coupling element 830 is the Josephson coupling element 500 described in FIG. 5.

The first section 820 and the second section 840 are parametrically coupled via the Josephson coupling element 830. The reactance of the Josephson coupling element 830 is modulated by a pump tone provided by the pump source 835.

The first section 820 and the second section 830 each includes a shunt LC resonator with admittance inverter on each side of the shunt LC resonator, as explained above in FIGS. 6 and 7.

The input port 310, a matched terminal, is connected to the shunt LC resonator via an admittance inverter formed by a capacitor network, for example, a combination of a series capacitor, labelled C5, and a couple of shunted capacitors. Since the shunt capacitors of the admittance inverter connecting the input port 310 and the shunt LC resonator within the first section 320 and the inductor labelled L3 are parallel to the capacitor of the shunt LC resonator, these capacitance values can be added to determine the capacitance of the capacitor labelled C7.

The Josephson coupling element 830, which includes an RF-SQUID as explained in FIG. 5, is connected to the shunt LC resonator of the first section 820, formed with a capacitor labelled C7 and an inductor labelled L3, via another admittance inverter including a series capacitor, labelled C2. As discussed above in FIGS. 6 and 7, the capacitance value of the series capacitor, labelled C2 can be determined based on the admittance value of the admittance inverter evaluated by $$J_{12} = \frac{\Delta\omega/\omega_0}{\sqrt{Z_1 Z_2 g_1 g_2}}$$

and the configuration of the admittance inverter shown in the panel 630, namely $$C2 = \frac{J_{12}}{\omega_A}.$$

The shunt capacitors of the admittance inverter, with a value, $-C2$, are not shown in FIG. 8. Since these are parallel to the capacitor labelled C7 of the LC shunt resonator and the capacitor labelled C1 of the Josephson coupling element 830, the capacitance value of the shunt capacitors of the admittance inverters, $-C2$, can be added to these capacitors, labelled C7 and C1. Similarly, shunt capacitors forming part of the admittance inverter connecting the input port 810 and the shunt LC resonator of the first section 820 along with the series capacitor labelled C5 can be incorporated by modifying the capacitance value of the capacitor labelled C7. Therefore, the capacitance values of the capacitors labelled C1 and C7 are first determined for the center frequency $\omega_A$ of the resonators then modified to incorporate the shunt capacitors of the admittance inverters on each side of the resonators.

The second section 840 includes a shunt LC resonator formed by a capacitor labelled C8 and an inductor labelled L4. The shunt LC resonator of the second section 340 is arranged to have the second center frequency $\omega_B$. Series capacitors, labelled C3 and C6, can be determined in a similar fashion to the series capacitors C2 and C5.

In this example, the Josephson parametric coupler 800 is designed such that $\omega_A$=5 GHz, $\omega_B$=7 GHz, $\Delta\omega$=350 MHz. The first section 820 is designed to have a passband with a center frequency of 5 GHz and the second section 840 is designed to have a center frequency 7 GHz. In this example, the values of the components of the first section 820 and the second section 840 were chosen such that the Josephson parametric coupler 800 has an overall response of a 4-pole Chebyshev response with 350 MHz bandwidth.

The Josephson coupling element 830 is designed such that when an appropriate pump tone $\Phi_{AC}$ is provided from the pump source 835, and the RF-SQUID is biased with appropriate $\Phi_{DC}$ value, a signal at 5 GHz is converted into a signal at 7 GHz at the Josephson coupling element 830. Therefore, when a signal with a first frequency $f_1$=5 GHz is input into the first port 810, this signal is converted into a signal with a second frequency $f_2$=7 GHz and outputted at the second port 850. Within the bandwidth, the frequency of the input signal is changed by $f_2-f_1$ at the output. In this example, the DC flux $\Phi_{DC}$=0.39 $\Phi_0$ and the AC flux $\Phi_{AC}$=0.05 $\Phi_0$.

Figure 9:
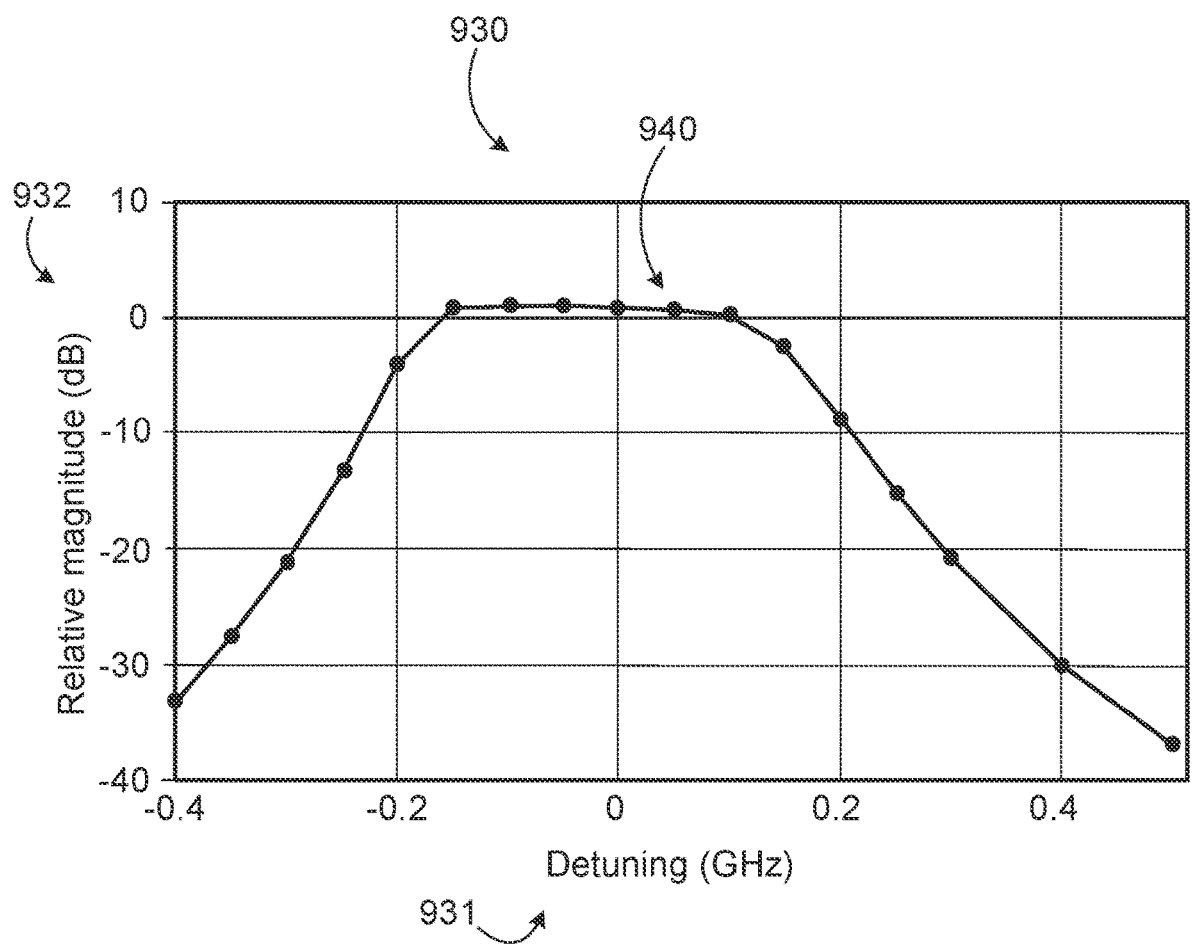
FIG. 9 shows a simulation result of the Josephson parametric coupler described in FIG. 8.

FIG. 9 shows a simulation result of the Josephson parametric coupler described in FIG. 8 with references to FIG. 8.

FIG. 9 shows a panel 930 which includes a result of the simulation performed with the WRSpice program, using the same specifications such as operating frequencies and transfer characteristics as the circuit in FIG. 8. The simulation was performed in a transient mode, where the time domain output was demodulated numerically to obtain the signal magnitude at the device output port 850. The pump amplitude in this simulation was $\Phi_{AC}$=0.05$\Phi_0$.

An x-axis 931 of the panel 930 represents detuning of frequency in GHz. A y-axis 932 of the panel 400 represents a relative magnitude in dB.

A curve 940 represents a relative magnitude of power outputted at the output port 850. For the curve 940, the x-axis 931 is with respect to $\omega_B$=7 GHz.

The first curve 940 shows that over approximately 350 MHz bandwidth with a flat response with a conversion gain of approximately 1.4 dB, consistent with the expected conversion gain from Manley Rowe relations.

Therefore, the simulation result shows that the Josephson parametric coupler 800 as shown in FIG. 8 functions according to the design specifications.

There can be a design with more than a single Josephson junction coupling element 130, 200, 330, 500, 830 in the circuit to operate at more than two distinct frequencies. In that case more than one pump tone needs to be provided.

Implementations of the subject matter and operations described in this specification can be implemented in suitable circuitry where input powers are low enough, operating temperatures are below the superconducting temperature of the device, and low loss and low insertion loss are required. Examples of such circuitry may include quantum computational systems, also referred to as quantum information processing systems, including the structures disclosed in this specification and their structural equivalents, or in combinations of one or more of them. The terms "quantum computational systems" and "quantum information processing systems" may include, but are not limited to, quantum computers, quantum cryptography systems, topological quantum computers, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In some implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

Fabrication of the quantum circuit elements and classical circuit elements described herein can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of about 1.2 kelvin), indium (superconducting critical temperature of about 3.4 kelvin), NbTi (superconducting critical temperature of about 10 kelvin) and niobium (superconducting critical temperature of about 9.3 kelvin). Accordingly, superconducting structures, such as superconducting traces and superconducting ground planes, are formed from material that exhibits superconducting properties at or below a superconducting critical temperature.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims.

What is claimed is:

1. A Josephson parametric device comprising:
   an input port;
   an output port; and
   a signal path between the input port and the output port, the signal path comprising:
      a first section coupled to the input port and having a first passband;
      a second section coupled to the output port and having a second passband; and
      a Josephson junction coupling element for parametric coupling between the first section and the second section, the Josephson junction coupling element coupled to and interposed between the first section and the second section,
   wherein the Josephson junction coupling element is configured such that, in response to the input port receiving a first signal at a first frequency lying within the first passband and the Josephson junction coupling element receiving a pump tone, the Josephson junction coupling element converts the first signal into a second signal with a second frequency lying within the second passband,
   wherein the Josephson junction coupling element comprises:
      a Josephson junction;
      a first resonator having the first passband; and
      a second resonator having the second passband,
      wherein the Josephson junction is interposed between and connected to the first resonator and the second resonator
      wherein the first section comprises at least one resonator having the first passband disposed between the input port and the first resonator in the signal path, and
      wherein the second section comprises at least one resonator having the second passband disposed between and the second resonator and the output port in the signal path.

2. The Josephson parametric device of claim 1, wherein the second frequency is a sum of the first frequency and a frequency of the pump tone.

3. The Josephson parametric device of claim 1, wherein a frequency of the pump tone is a sum of the first frequency and the second frequency.

4. The Josephson parametric device of claim 1, wherein the first resonator comprises a first series inductor and a first shunt capacitor, wherein the second resonator comprises a second series inductor and a second shunt capacitor, wherein the first series inductor and the Josephson junction are electrically connected to each other in series, and wherein the second series inductor and the Josephson junction are electrically connected to each other in series.

5. The Josephson parametric device of claim 1, wherein the first resonator and the second resonator comprise a transmission line stub.

6. The Josephson parametric device of claim 1, wherein the first resonator and the second resonator comprise a transmission line-based resonator.

7. The Josephson parametric device of claim 1, wherein the at least one resonator having the first passband and the at least one resonator having the second passband comprise shunt resonators.

8. The Josephson parametric device of claim 7, wherein the shunt resonators each comprise a shunt capacitor and a shunt inductor.

9. The Josephson parametric device of claim 7, wherein each of the at least one resonator comprises a resonator stub.

10. The Josephson parametric device of claim 7, wherein the shunt resonators each comprise a transmission line-based resonator.

11. The Josephson parametric device of claim 1, wherein the Josephson junction coupling element is an RF SQUID.

12. The Josephson parametric device of claim 11, wherein the RF SQUID is arranged such that, in response to a first external flux bias applied to the RF SQUID, a Josephson inductance value of the RF SQUID diverges such that passive inductive coupling between the first resonator and the second resonator is reduced.

13. A method of designing a Josephson parametric device comprising:
an input port;
an output port; and
a signal path between the input port and the output port, the signal path comprising:
  a first section coupled to the input port and having a first passband;
  a second section coupled to the output port and having a second passband; and
  a Josephson junction coupling element interposed between the first section and the second section,
the method comprising:
  providing a first number of resonators j in the first section and a second number of resonators N-j in the second section;
  providing a first resonance frequency $\omega_A$ to the resonators in the first section and a second resonance frequency $\omega_B$ to the resonators in the second section and a decay rate $\gamma$ between the input port and the first section and between the second section and the output port;
  providing a bandwidth, $\delta\omega$, of the first section and the second section;
  providing an impedance $Z_1$ to $Z_N$ for each of the resonators;
  providing normalized element values $g_0$ to $g_{N+1}$,
  wherein $g_0$ represents a normalized impedance at the input port, $g_{N+1}$ represents a normalized impedance at the output port, and $g_1$ to $g_N$ represent normalized impedances of the N resonators of the first section and the second section, and
  wherein the normalized element values $g_0$ to $g_{N+1}$ are determined according to tabulated values of a response function of the first section and the second section;
  calculating admittance values, $J_{01}$ to $J_{N,N+1}$,
  wherein a first admittance value, $J_{01}$, represents admittance of a first circuit element to be disposed between the input port and a resonator of the first section adjacent to and coupled to the input port, an N+1-th admittance value, $J_{N,N+1}$, represents admittance of an N+1th circuit element to be disposed between the output port and an N-th resonator of the second section adjacent to and connected to the output port, and an i-th admittance value, $J_{i-1,i}$, represents admittance of an (i)-th circuit element to be disposed between an (i-1)-th resonator and an i-th resonator,
  wherein the first admittance value, $J_{01}$, is given by $$J_{01} = \sqrt{\frac{\frac{\delta\omega}{\omega_1}}{Z_1 Z_0 g_1 g_0}},$$

wherein the i-th admittance value, $J_{i-1,i}$, is given by $$J_{i-1,i} = \sqrt{\frac{\frac{\delta\omega^2}{\omega_{i-1}\omega_i}}{Z_{i-1}Z_i g_{i-1} g_i}},$$

and
  wherein the N+1-th admittance value, $J_{N,N+1}$, is given by $$J_{N,N+1} = \sqrt{\frac{\frac{\delta\omega}{\omega_N}}{Z_N Z_0 g_N g_N}},$$

and
  where $Z_0$ is an impedance of the input port, $Z_{N+1}$ is an impedance of the output port, and $Z_i$ is an impedance of the i-th resonator;
  calculating a coupling coefficient, $\beta_{j,j+1}$, representing a degree of coupling between a j-th resonator included in the first section and a j+1-th resonator included in the second section,
  wherein j is the first number and N-j is the second number,
  wherein the coupling coefficient, $\beta_{j,j+1}$, is given by $$\beta_{j,j+1} = \frac{\delta\omega}{2\gamma \sqrt{g_j g_{j+1}}};$$

and
  calculating, based on the coupling coefficient, $\beta_{j,j+1}$, an AC flux, PAC for applying to the Josephson junction coupling element.

14. The method of claim 13,
wherein the calculating, based on the coupling coefficient, $\beta_{j,j+1}$, the AC flux, PAC for applying to the Josephson junction coupling element is based on $$\Phi_{AC} = \frac{16\gamma\beta_{j,j+1}}{\frac{dM_{j,j+1}}{d\Phi}}\sqrt{\frac{L_jL_{j+1}}{\omega_A\omega_B}},$$

wherein a DC flux, $\Phi_{DC}$, applied to the Josephson junction coupling element is given by $$\Phi_{DC} = \frac{1}{4}\Phi_0 + LI_c,$$

wherein L is a linear inductance of the Josephson junction coupling element, $I_C$ is a critical current of the Josephson junction, $\Phi_0$ is a magnetic flux quantum, $$\frac{dM_{j,j+1}}{d\Phi}$$

is a slope of a mutual inductive coupling between the j-th resonator and the (j+1)-th resonator with respect to a flux bias applied to the Josephson junction coupling element, and $L_j$ and $L_{j+1}$ are inductance values of the j-th resonator and the (j+1)-th resonator, respectively.

15. The method of claim 13, wherein the Josephson junction coupling element comprises an RF-SQUID.

16. The method of claim 13, wherein the first number is equal to the second number such that j=N/2.

17. A method of using the Josephson parametric device of claim 1, the method comprising:
  determining the first frequency of the first signal and the second frequency of the second signal;
  determining a frequency of the pump tone such that, when the pump tone is provided to the Josephson junction coupling element, the first signal is converted into the second signal;
  providing the pump tone to the Josephson junction coupling element; and
  providing the first signal at the first frequency to the input port.

18. The method of claim 13, comprising applying the AC flux, $\Phi_{AC}$, to the Josephson junction coupling element.

19. A Josephson parametric device comprising:
  an input port;
  an output port; and
  a signal path between the input port and the output port, the signal path comprising:
    a first section coupled to the input port and having a first passband;
    a second section coupled to the output port and having a second passband; and
    a Josephson junction coupling element for parametric coupling between the first section and the second section, the Josephson junction coupling element coupled to and interposed between the first section and the second section,
  wherein the Josephson junction coupling element is configured such that, in response to the input port receiving a first signal at a first frequency lying within the first passband and the Josephson junction coupling element receiving a pump tone, the Josephson junction coupling element converts the first signal into a second signal with a second frequency lying within the second passband,
  wherein the Josephson junction coupling element comprises:
    a Josephson junction;
    a first resonator having the first passband; and
    a second resonator having the second passband,
    wherein the Josephson junction is interposed between and connected to the first resonator and the second resonator
  wherein the first section comprises at least one resonator having the first passband disposed between the input port and the first resonator in the signal path,
  wherein the second section comprises at least one resonator having the second passband disposed between and the second resonator and the output port in the signal path, and
  wherein the at least one resonator having the first passband and the at least one resonator having the second passband comprise shunt resonators.

* * * * *